(12) United States Patent
Kim

(10) Patent No.: US 6,775,663 B1
(45) Date of Patent: Aug. 10, 2004

(54) INFORMATION CODING AND RETRIEVAL SYSTEM AND METHOD THEREOF

(76) Inventor: Si Han Kim, 338-1, Daessangyong-Ri, Choweol-Myun, Kwangju-Kun, Kyunggi-Do (KR)

( * ) Notice: Subject to any disclaimer, the term of this patent is extended or adjusted under 35 U.S.C. 154(b) by 163 days.

(21) Appl. No.: 09/890,365

(22) PCT Filed: Dec. 14, 2000

(86) PCT No.: PCT/KR00/01460

§ 371 (c)(1),
(2), (4) Date: Jul. 30, 2001

(87) PCT Pub. No.: WO01/44986

PCT Pub. Date: Jun. 21, 2001

(30) Foreign Application Priority Data

Dec. 17, 1999 (KR) .......................................... 1999-58696
Mar. 31, 2000 (KR) .......................................... 2000-16986
Nov. 22, 2000 (KR) .......................................... 2000-69722

(51) Int. Cl.[7] .............................................. G06F 17/30
(52) U.S. Cl. .............................................. 707/3; 707/4
(58) Field of Search ............................ 707/1, 2, 3, 5, 707/10, 102; 704/8, 9; 706/11; 715/501.1

(56) References Cited

U.S. PATENT DOCUMENTS 5,428,727 A   6/1995  Kurosu ........................ 707/502
6,002,753 A  12/1999  Morrison ................... 379/112.01
6,026,388 A  * 2/2000  Liddy et al. .................... 707/1
6,363,373 B1 * 3/2002  Steinkraus ..................... 707/3

FOREIGN PATENT DOCUMENTS

KR   10-1998-004912    10/1998
KR   10-1998-0055112    7/2000

* cited by examiner

*Primary Examiner*—Diane D. Mizrahi
*Assistant Examiner*—Apu Mofiz
(74) *Attorney, Agent, or Firm*—Norris, McLaughlin & Marcus, P.A.

(57) ABSTRACT

A search engine system with coded information and a search method using the same is descovised. The system includes a key word input part, a database for storing information as word codes which are not real standard words, and a central process unit for assigning a word code assigned to a standard word to a word input through the key word input part or a client system, and searching information corresponding to the word code of the input word through the database. When key word(s) relating to information to be searched are input through the information input system, the input words are coded and the search is performed using the word codes through the database, thereby searching the information more precisely. In addition, since a plurality of different words having similar or same meanings are coded as one standard word code according to a simple coding rule and stored in the database, the process time for searching the information can be greatly reduced.

23 Claims, 14 Drawing Sheets

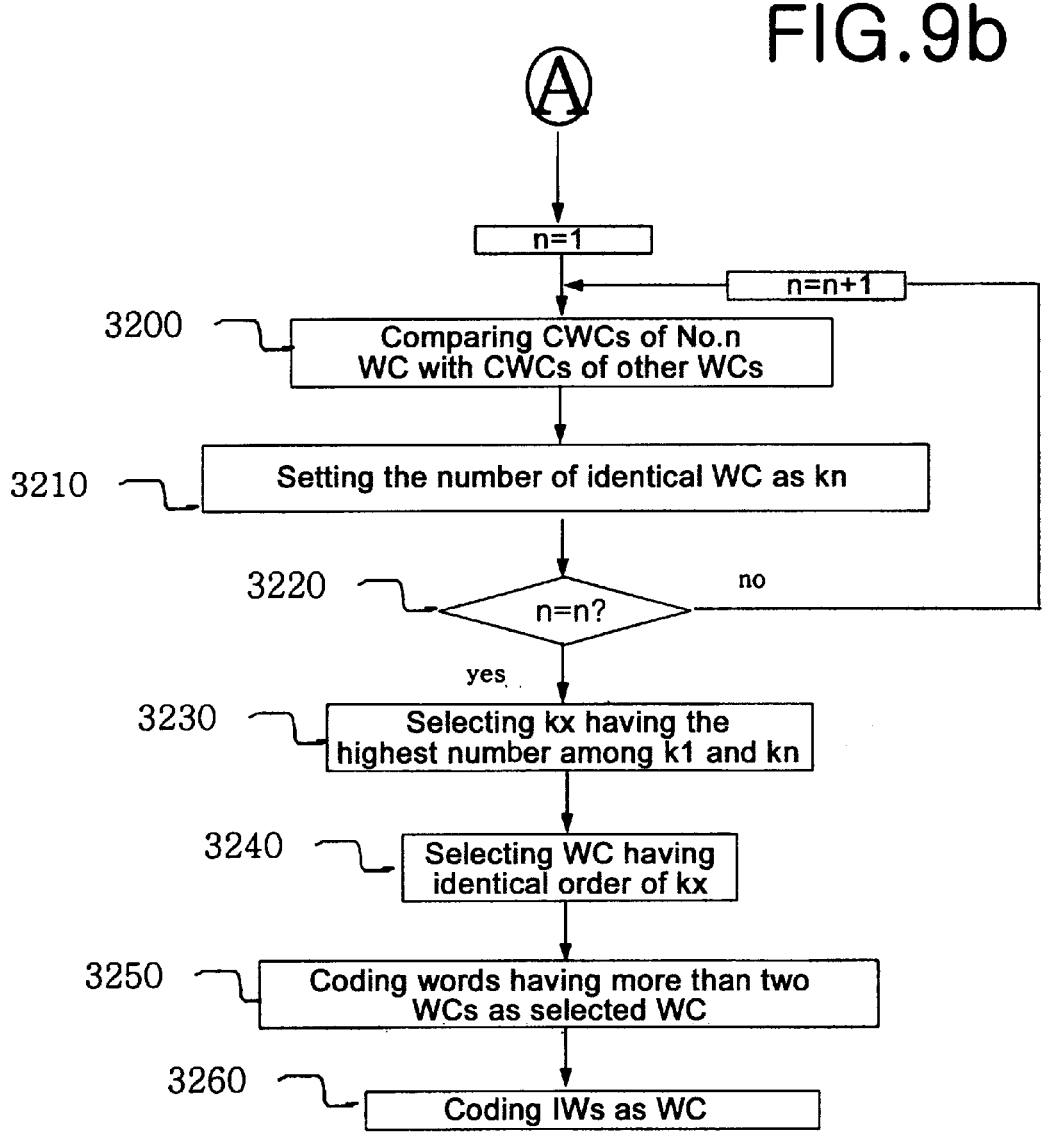

INFORMATION CODING AND RETRIEVAL SYSTEM AND METHOD THEREOF

TECHNICAL FIELD

The present invention relates to an information coding and retrieval system and method and, more particularly, to an information coding and retrieval system and method that can code information concepts as word codes by dividing the information concepts into basic words, and that can retrieve the information using the word codes.

BACKGROUND ART

In recent years, information exchange through the Internet has experienced exponential growth. Therefore, a variety of search engines have been developed for quickly and accurately searching information through the Internet has been developed.

However, since all of the prior search engines are designed such that they can search only the information which exactly complies with the word the user inputs, when the user does not know the word complying with the information he wants to find, it is difficult to find the information.

Accordingly, there is a need for a search engine capable of finding the information desired by the user precisely and quickly.

DISCLOSURE OF INVENTION

Therefore, the present invention has been made in an effort to solve the above-described problems of the prior art. It is an objective of the present invention to provide an information coding and retrieval system capable of quickly and accurately searching the information the user desired to find.

To achieve the above objective, the present invention provides an information coding and retrieval system comprising:
   an input part for inputting word;
   a database for storing the information which is subdivided in a basic word and coded in a word code; and
   a central process unit for coding the input word input through the input part or a client system, retrieving the information stored in the database to find information corresponding to a word code of the input word.

The database further stores command words coded as word cords for operating a plurality of computer programs and words for describing the programs, and the central process unit codes the input word as a basic word, selects a command word corresponding to the coded basic word by retrieving the database, and operates a computer program corresponding to the selected command word.

The central process unit codes the input word input through the input part as a basic word code and stores the same in the database.

When the input word is composed of basic words, the central process unit codes the input word as basic word codes, and when the input word is composed of compound words, the central process unit subdivides the input word as basic words and codes the compound words as basic word codes.

The client system comprises a user's input part for inputting words, a client processor for coding the input words as basic word codes and transmitting the same to the central process unit, and a client database in which a word code list for the coding is stored.

The central process unit retrieves the information corresponding to the input word codes transmitted from the client processor without performing an additional coding operation.

The system may further comprise a display for displaying the information and an interface connected to the client system and other servers.

The present invention provides an information coding and retrieval method comprising the steps of:
   storing information into a database after subdividing the information into basic words and coding the information as basic word codes;
   coding an input word input through an input part or a client system as a basic word code; and
   retrieving the information stored in the database to find information corresponding to the word code of the input word.

The input word is composed of the basic words, the input word is coded as the basic word codes, and when the input word is composed of the compound words, the compound words are subdivided into basic words and coded as basic word codes.

When the input word is a foreign language, the input word is coded as a word code of a national language having the same meaning as the foreign language.

In the step of coding, only main words among words describing the input word are coded.

In the step of coding, only one basic word among basic words having an identical meaning is selected as basic words.

In the step of coding, the word is coded while the number of code digit of the basic word is uniformly maintained.

In the step of coding, the word is coded according to a code arrangement order set in the consideration of a function and a part of speech of the basic word.

When the input word is a sentence, a functioning code is assigned to each word of the sentence.

When the input word is a sentence, the step of retrieving further comprises subdividing the input word into basic words; coding the input words into a basic word code; and retrieving the database to find the information having a word code identical to the coded word code.

When there is no word code identical to the word code of the input word in the database, the step of retrieving further comprises the step of searching the information having a noun, a verb, and an adjective that are corresponding to a noun, a verb, and an adjective of the input word; and when there is no information, searching the information having a word code corresponding to a noun, a verb, and an adjective of the input word regardless of a part of speech.

When there is no information having a word code corresponding to a noun, a verb, and an adjective of the input word regardless of a part of speech, information having the highest number of identical sub-constituting word code is searched among a plurality of information having an identical main-constituting word code to that of the input word.

When the input word is a multiple meaning word having more than two meanings, word codes describing each meaning are compared, and one of the word codes are selected and coded.

The constituting word codes of the multiple meaning word are compared with constituting word codes of other words, one of more than two word codes of the multiple meaning word is selected, and the multiple meaning word is coded as the selected word code.

The step of retrieving further comprises steps of:
   classifying the input word into multiple meaning words and normal words;

coding the normal word as word codes;

coding the multiple meaning words into multiple meaning word codes;

determining a degree of identity between the multiple meaning word codes and other word codes and selecting the highest identical multiple meaning word code;

coding the multiple meaning word as the selected multiple word code.

When the number of multiple meaning word is more than two, the step of retrieving further comprises the steps of:

assigning an order to the multiple meaning words;

establishing a plurality of word code sets using a combination of word codes of the multiple meaning words by assigning order to word codes of the multiple meaning words;

comparing constituting word codes in each set and selecting a word code set having the highest number of constituting word codes appearing at least two times; and coding the multiple meaning word as the selected multiple word code.

When the number of multiple meaning word is more than two, the step of retrieving further comprises the steps of:

comparing word codes of each multiple meaning word with word codes of other multiple meaning words and normal words to select the most identical word code; and coding the multiple meaning word as the selected multiple word code.

When comparing the constituting word codes of each word code of the multiple meaning word, constituting word codes of special word code of the multiple meaning word are also compared, and the constituting word codes to be compared include a field identification code.

The step of retrieving further comprises the steps of:

providing a menu for inputting a retrieval word to the user;

coding the retrieval word into a basic word code;

retrieving the database using the coded word code; and providing the information corresponding to the retrieved word code to the user.

When the word code of the retrieval word is not in the dababase, the step of retrieving further comprises:

requiring input of message describing the retrieval;

subdividing the words of the message into basic words;

coding the words of the message in word codes including main-constituting word codes and sub-constituting word codes; and retrieving the database using the coded word code.

The step of retrieving further comprises the steps of:

retrieving word codes having a main-constituting word code identical to the main-constituting word code of the retrieval word;

retrieving word codes having sub-constituting word codes identical to those of the retrieval word;

selecting a word code having the highest number of identical codes except for the main-constituting word codes and the sub-constituting word codes; and providing the information corresponding to the selected word code to the user.

The step of retrieving is performed by searching the information having the highest number of identical constituting word codes of the retrieval word to be retrieved.

The step of retrieving is performed by searching the information having the most similar number of frequency of the constituting word codes of the information to be retrieved.

The basic words are assigned with numerals and represented by an axis of coordinates, and the number of frequency of the basic words is represented by a scale on the axis of coordinates to display each of the information as a location valve in a Vector space.

The present invention will be described more in detail with reference to the accompanying drawings.

BRIEF DESCRIPTION OF DRAWINGS

FIGS. 9a to 9e are flowcharts illustrating a multiple meaning word coding method according to a sixth embodiment of the present invention.

BEST MODE FOR CARRYING OUT THE INVENTION

Figure 1:
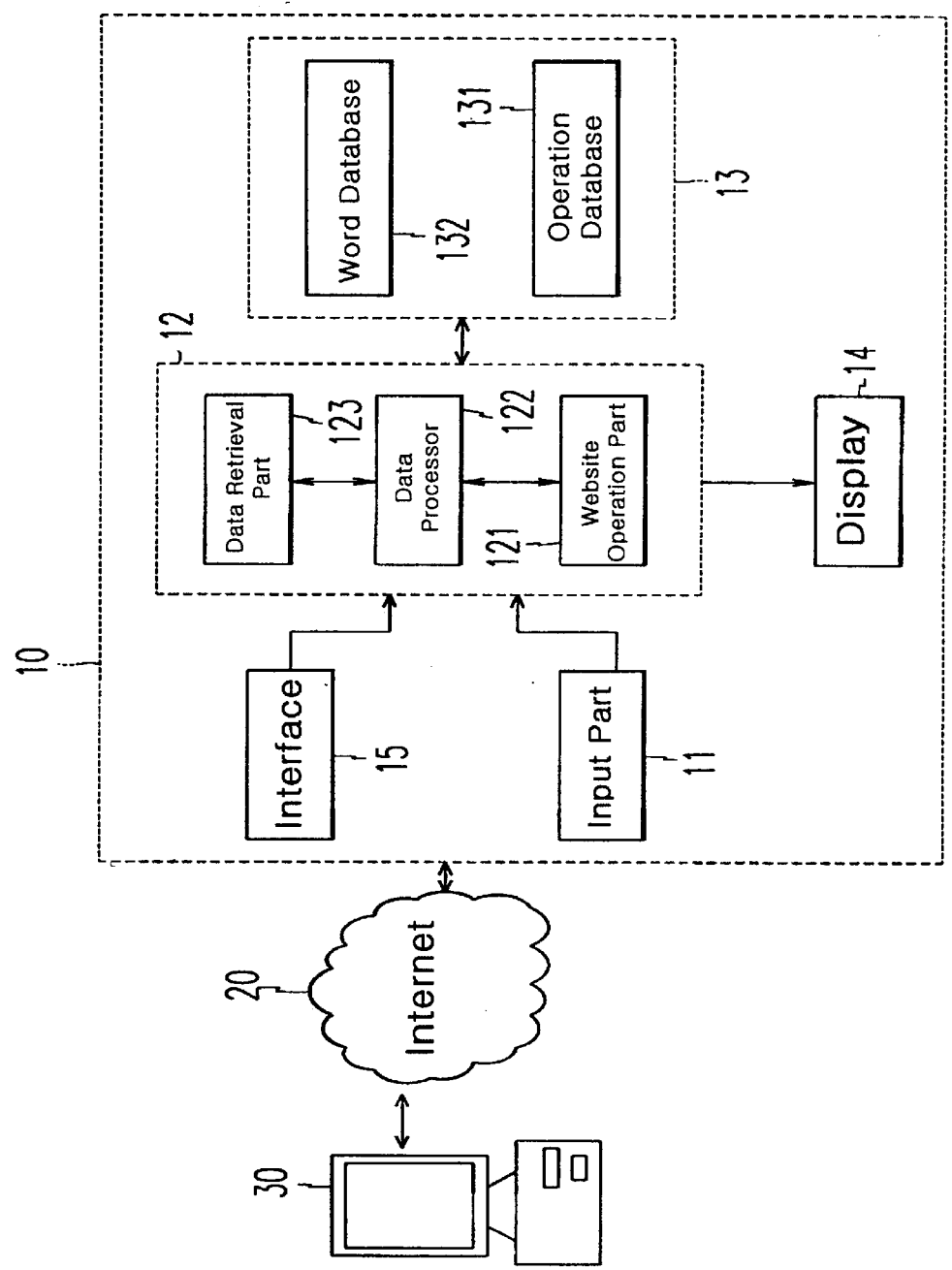
FIG. 1 is a block diagram of an information coding and retrieval system according to the present invention.

FIG. 1 shows a block diagram of an information coding and retrieval system according to the present invention.

As shown in FIG. 1, an information coding and retrieval system 10 ("system") according to the present invention comprises an input part 11 for inputting input words representing a plurality of information, a database 13 for storing information concepts which are subdivided into basic words and coded as words, and a central process unit 12 for coding input words input through a client system 30 as word codes of the basic words and retrieving the plurality of coded information stored in the database 13 to search information corresponding to the input words.

In addition, the system 10 comprises a displaying part 14 for displaying the information, and an interface part 15 operated according to the control of the central process unit 12 to exchange data with other servers or the client system 30.

In the above-described system 10, a variety of information input through the input part 11 is subdivided into basic words by the central process unit 12, coded as basic word codes in accordance with a predetermined method, and then stored in the database 13. The information corresponding to the input word is retrieved among the information stored in the database on the basis of the word codes, and transmitted to the client system 30 or displayed on the display part 14.

The database 13 comprises an operating database 131 for storing the data for operating the system or Internet website and a word database 132 for storing the information concepts that are classified into the basic words and coded as the word codes.

In addition, the central process unit 12 comprises a website operating part 121 for operating the internet website and the system using the data stored in the operating data base 131, a data process part 122 for subdividing concept into basic words, and coding the basic words into word codes, and storing the word codes in the word database 132, and a data retrieval part 123 for searching information corresponding to the input word input in the word database 132 on the basis of the word codes coded in the data process part 122.

A computer or other communicating terminals can be used as a client system 30 that can connect to the system 10 of the present invention.

A coding rule in information coding and retrieving methods which are realized by the system of the present invention will be described hereinafter.

1) In the present invention, words representing the information concepts are classified into basic words and compound words. The compound words include more than one basic word.

Generally, words represent a concept or a shape of a thing. There are many concepts or things that are represented by at least two different words.

For example, the word "hand" may mean "palm" or "fingers". And the word "dignitary" may be replaced by "high official".

Therefore, in the present invention, all words representing information concepts are classified into basic words that can be used to describe other words and compound words. The compound words are further classified into a plurality of basic words. Accordingly, all of the words representing the information can be described using more than one basic word.

This concept comes from a human understanding system. That is, humans understand new words or concepts by combining the words and concepts they already know Based on such an approach, in the present invention, basic words that can be basic words of all words are first made, and then a word code system that can represents all words using the basic words is completed.

Here, it is preferable that the basic words are selected from words that can be basic frames for the language expression. Accordingly, even a word has a compound word characteristic, this compound word can be selected as a basic word even if it can be the frame for the language expression. For example, since the Korean word "Kwan" means an "official", the word "Kwan" should be the compound word. However, since "Kwan" can be used for representing other words, it can be the basic word.

2) Words that can be symbols representing shapes can be basic words.

For example, the word "hand" represents "palm and fingers". However, since everyone can image the shape of the hand whenever he/she hears that word "hand" such a word "hand" can be codes as a basic code without describing the meaning of the word.

3) A proper noun can be the basic word or other basic words.

For example, the word "White House" is a proper noun, so it can be represented as a basic word having a code "whh". In addition, the "White House" can be expressed as "a house where the president of the United States resides". Accordingly, it can be coded as "House(hou)-President(pre)-United States of America(usa)-living(liv)=>hou-pre-usa-liv". That is, "White House" can be coded as both "whh" and "usa-pre-su- liv-adj—hou".

As another example, "Elizabeth Taylor" can be coded as "eli". In addition, "Elizabeth Taylor" can be represent as "famous(fam) actress(act) of United States of America(usa) ". Accordingly, "Elizabeth Taylor" can be coded as both "eli" and "fam-act-usa".

As described above, the basic words can be expressed as other basic words.

4) Basic words having identical meanings can be coded as an identical code or different codes.

For example, "word" and "language" have identical meanings. Accordingly, they can be coded as "Ian". In addition, they can have different odes such as "lan-1" and "Ian-2" so as to classify them.

5) The words are coded such that accidences thereof can be identified.

Basic words are selected in accordance with the basic type and coded so that the declension of the basic can be identified when the basic words are declined. For example, if the word is adjective, it can be assigned a code such as "adj" and if a noun, assigned "nou".

In the present invention, English and Korean may be different in the accidence. Therefore, a code representing the accidence such as "n" representing a noun and "v" representing a verb may follow a basic word.

For example, the Korean word "Sarang" means only the noun "love", but the English word "love" may be a noun "love" or a verb "do love". Therefore, a code of "Sarang" can be "lov-n", and a code of "love" can be both "lov-n" and "lov-v" so that the part of speech of "love" can be identified.

6) Codes are arranged in accordance with a predetermined order when basic words are coded.

For example, a location of a word to be decorated is first determined, and then a code corresponding to the word is arranged at a last position.

7) In the case of a foreign language, the above-described method is identically applied.

Basic words of Korean have the same codes as those of English. For example, the Korean word "An-a" corresponds to the English word "language". When "An-a" is a basic word, the English word "language" becomes a basic word. In addition, when code of "An-a" is "lan", "language" is also coded as "lan".

9) The basic words can be properly selected according to the classified fields. Words are coded to be in the field in which the word can be identified.

In the above described information coding and retrieval method, when selecting the basic words, for example, in the case of "liquid crystal display", although it is difficult to assign the same basic word, since "Liquid Crystal Display" can be a new technology field, both "liquid crystal" and the "display" can be independently basic words.

Accordingly, each of the basic words can be assigned with a code representing the field of technology where the words are contained. For example, when "liquid crystal display" is coded as "lic dis", "active matrix" which is included in liquid crystal display technology can be coded as "lic dis act ma" so that the technology field of the "active matrix" can be easily identified.

10) When a word has more than two meanings, the word can be coded as more than two codes.

For example, the word "face" means a face of an animal or makeup. Accordingly, the word "fac" can be coded as "face" when it means the face of an animal and as "mup" when it means makeup.

11) Basic words representing a degree can be coded such that the degree can be identified.

For example, the word "red" may have meanings such as "deep red", "crimson", and "rubicund", which represent different shades of red. Accordingly, these words can be expressed numerically. That is, since all of these words mean red, the shade of red for the words can be expressed as 1–10. For example, the word "deep red" can be coded as "red(10)-adv", the word "crimson" can be coded as "red(8)-adj", the word "red" can be coded as "red(3)-adj", and the word "rubicund" can be coded as "red(1)-adj".

The codes of the basic words that can be coded according to the above-described rules should be differentiated from each other.

In the present, the above-described rules are selectively combined when words are coded. In addition, the number of the basic words is limited in a predetermined number. In this case, when the number of basic words is too small, since the compound words are classified into too many basic words, the time for coding the words and the storage of the memory are increased.

Accordingly, it is important to properly set the number of the basic words so that the coding operation can be effectively performed. As a preferred embodiment, the basic words can be set as follows.

First, one word among words having high frequency of use and the same meaning is first selected. At this point, even if parts of speech of the words are different from each other, only one word is selected as a basic word if the meanings of the words are the same as each other. For example, the word "pain" is set as a basic word, while the words "painful" and "suffering" are omitted from the basic words.

Second, the basic word should be either a noun, verb or adjective.

Third, a word among words used for describing other words is selected as a basic word.

Fourth, words which are not basic word characteristic but used as if they are universally basic words. For example, internet, telephone, communication, computer, gene, bio, program, game, professional, sports, cinema, actor(actress), star, newspaper, TV, cassette, CD, human being, America, president, stock and the like can be set as basic words.

In addition, it is necessary to reduce the number of digits of the word code corresponding to one word since the word code representing descriptive words may be too long if all of words expressing something are coded. A method for reducing the length of a word code will be described hereinafter.

A) The number of digits of a word code of a basic word is uniformly maintained and minimized.

In the present invention, the number of digits of a word code is two. At this point, the characters used for the word code includes the alphabet, Arabic numerals, and special symbols such as, for example, "$, #, %, /, &, +". Accordingly, the basic words can be coded in a variety of codes.

If only the alphabet is used, since a total of 576 basic words can be represented in code states, the special symbols are additionally used so that an increased number of basic words can be coded using two digits code.

For example, basic words "pain", "acid", and "across" can be respectively coded as "p1", "a2", and "#c".

In addition, among 255 words having an 8-bit word code considering ASCI code, all of the words except for the "small alphabets, $, #, %, /, &, and +" can be used as word codes. At this point, the alphabets are coded with two digits, and other words are coded with one digit, thereby reducing the number of digits.

That is, when the number of basic words is 1140 and the number of code digits is 2, the number of codes that can be expressed using Arabic numerals, small alphabet letters and symbols "$, #, %, /, &, +" becomes 1600. Therefore, another 215 words come from ASCI code can be used in coding the basic words. That is, since 215 words are coded as basic words using one digit and the rest of the 40 words are coded as basic words using two digits, the digit number of whole word codes can be reduced, thereby reducing the capacity of the storage system.

B) When coding a plurality of words which describe a word, an arrange order is set in the word code.

In the present invention, when coding a plurality of words illustrating a word, a subject word is set as a main-constituting word, and other words are set as sub-constituting words. For the convenience, when the plurality of words illustrating a word is called as "descriptive sentence", the words constituting the "descriptive sentence" are arranged according to the following order.

Code for illustrating a part of speech—Main-constituting word code—Sub-constituting word code functioning a modifier or a verb—Code or adverbial phrase representing an area where the main-constituting word exists.

The sub-constituting word code can be optionally selected. As described above, when the words are arranged according to the predetermined order, there is no need to indicate a part of speech to each word.

For example, when coding the descriptive sentence illustrating the White House, the Korean sentence "Mikook(usa) Daetongryong(pre) i(su) Sa(liv)Nun(adj) Jib(hou)" can be coded as "usa-pre-su-liv-adj—hou". When this code is rearranged according to the above-described rule A to B, the simple word code of the White House becomes "nholipr-ius". Here, "n" indicates a code illustrating a part of speech, "ho" indicates a main-constituting word code, "li" and "pr" indicate a sub-constituting word code illustrating "Sanun" and "Daetongryong", "–" indicates an adverbial phrase where the main word exists, "us" indicates the United State of America, and "i" indicates "in" describing a place. As described above, the descriptive sentence can be coded as a simple code by reducing the length of the word code.

In addition, to discriminate a word code modifying the main-constituting code and a sub-constituting word code functioning as a verb, a special identification code "=" is disposed after the main-constituting word code so that it can be identified that a code after the special identification code is the sub-constituting word code functioning the verb.

As described above, by setting the code arranging order in a word code, the functioning of each code with each word code can be identified, and a code for illustrating the functioning of each code can be omitted, reducing the whole word code.

C) When coding a plurality of words, only major words can be selectively coded.

To reduce the number of codes describing a word, only the major words that affect the illustration of a descriptive sentence can be selected and coded. Although the major words may be the noun, verb and adjective, any one of these can be excluded from the major words. For example, "the White House" is "a house where the president of the United States of America is living". The "America", "President" and "House" are the major words that can directly affect the meaning of the White House. However, the "is living" is not a major word and therefore is not necessary to understand the meaning of the White House. Therefore, the "a house where the president of the United States of America is living" can be coded without coding the "is living".

In addition, the word "engine" means "machinery having movable parts generating power using steam, electricity, and oil and the like". Since all of the words constituting the descriptive sentence illustrating the engine are not basic words, these words should be converted into basic words and coded. At this point, the code becomes too long. Therefore, in the descriptive sentence, the power(po), the machinery (ma), the steam(st), the electricity(el), generation (make, mk), and the oil(ol) can be selected as the major words.

Accordingly, the simple word code of the descriptive sentence of the engine becomes "nmamkpo-fstelol". The "–" indicates an area, and the "f" is a code "using". When only major words are selected and coded as described above, the length of the code can be reduced, while fully representing the meaning of the sentence.

It is preferable that the selection of the major words is done in a manner carried out by humans, rather than a mechanical algorithm.

D) In case of "or" and "and", they can be respectively coded as "or" and "an" so as to represent the connection of paragraphs and words For example, in the "nmamkpo-fstelolor", the three words, steam(st), electricity(el), and oil(ol), can be connected to each other using the OR logic.

E) The basic words can be properly selected according to the field where words are included, and the words are coded such that the field they are included in can be identified.

That is, each field is assigned with a code, and this field code is located ahead of the word. For example, when a word is included in a semiconductor or medical field, "se" or "me" is assigned ahead of a code of the word.

When a code for representing a field is assigned to a word code, it is possible for a user to determine the field where the word he/she wants to search is included. That is, the user can retrieve the information in the field which is identical to that of a field code assigned to the word code.

For example, a word "valve" included in a medical field can be described as "an organ (og) for controlling (co) a blood (bl) flow (fl) in a heart (ha) ". Accordingly, the word "valve" can be coded as "menog =coblfl-iha". Here, the "me" is a code for representing that the "valve" is included in the medical field, the "n" is a code for representing that a part of speech of the "valve" is the noun, the "og" represents "organ," the "=" represents that the follow word is a sub-constituting word code functioning as a verb.

The first alphabet of a word code representing an area or a field cannot be the alphabets "n, v, a, and d" which are used to represent a part of speech.

F) A basic word can be represented using a code composed of other basic words.

For example, the word "cold" is a basic word, and this can be coded as "cl". However, for the convenient word search or use, "cold" can be described as "a temperature(te) lower (lo) than(t) an normal (usual, ul) state". Therefore, this can be coded as "atelo-tul".

Accordingly, the word "cold" can be coded as "cl" and "atelo-tul". That is, it is coded as either a basic word code or a descriptive sentence code. Therefore, when retrieving the word "cold", two word codes "cl" and "atelo-tul" are generated and information which corresponds to both the two word codes is selected.

In the present invention, the basic words are selected to code and store the information concept. Table 1 shows a list of the basic words. The basic words selected in the present invention are symbolically represented using English. However, any language can be used in selecting the basic words.

All of the words in the basic word list represent only one meaning. That is, even if a word has more than two meanings, only one meaning which is more commonly used is represented. In the present invention, a sentence can be coded using the above-described basic word coding method. A method for coding sentences will be described hereinafter.

In the present invention, input words are classified into basic words and each basic word is coded as a word code composed of an alphabet or Arabic numerals. The input word can be one word, a phrase, or a clause. An input word is coded as a basic code, which is called as a word code, and a 2-digit code constituting the word code is called as a constituting code. In the present invention, when the input word is a sentence, a functioning code is assigned to each word.

For example, "In 2000s, the engine technology increasingly becomes electronized" can be coded as "in 2000s, the engine(nmamkpo-fstelolor) technology(nkn-iscinan) increasingly becomes (vbc) electronized (nel)". The subject of this sentence is "technology", the modifier is "engine", and the predicate adjective is "electronized". At this point, the "S" is a code for representing the subject of the sentence, the "A" is a code for representing the modifier, the "V" is a code for representing the adjective, and the "T" is a code for representing the adverbial phrase.

The word "engine" means "machinery having movable parts generating power using steam, electricity, and oil and the like". Since all of the words constituting the descriptive sentence illustrating the engine are not the basic words, these words should be converted into the basic words and coded. At this point, the code becomes too long. Therefore, in the descriptive sentence, the machinery(ma), generation(make, mk), the power(po), using(-f), the steam(st), the electricity (el), and the oil(ol) and the like(or) can be selected as the major words.

Accordingly, the simple word code of the descriptive sentence of the engine becomes "nmamkpo-fstelolor". The "–" indicates an area, the "f" is a code "using", and the "or" indicates disjunction(OR) relation. When only major words are selected and coded as described above, the length of the code can be reduced, while fully representing the meaning of the sentence.

In addition, "technology" can be a basic word representing "knowledge (kn) in an industry (in) and a science (sc)". Therefore, in accordance with the above described coding rule, it can be coded as "nkn-iscinan". The "n" is a code for representing the part of speech of the basic word "technology", and the "an" is an And-logic code for representing the relationship between the "sc" and "in".

In the above described word code, functioning codes can be assigned thereto. "In 2000s(nyrT), the engine(nmamkpo-fstelolorA) technology(nkn-lsc inanS) increasingly becomes (bvcV) electronized (nelV)". Here, the functioning codes can be capital letters to be discriminated from the word codes.

As another example, in the sentence "The president(npr), Clinton, in the United States is living in a whirl of business at the White House", "Clinton(C)" is a proper noun, "president" is a subject(S), "in the White House" is an adverbial phrase(P) representing a place, "living" is a predicate of a sentence (V), "in the United State" is also an adverbial phrase (P) representing a place. Therefore, when functioning codes are assigned to the sentence, the sentence can be coded as "usP Clinton(C) nprS nhoofpr-iusP vliV".

As described above, only major codes in the sentence are coded and the functioning codes are assigned to the major codes. In this case, a period or a rest can be identically used.

For reference, since Clinton is a proper noun, a code "C" is assigned and is not converted into a word code.

In addition, the function of the words can be identified by variously analyzing the words according to conventional linguistics theory.

The function of the words can be automatically analyzed using a program such as a conventional word processor program. The function analyzing theory has been used in translation programs.

In addition, the adverbial phrase representing a place or a time can be identified by analyzing an auxiliary word behind an adjacent word. For example, the White House is a noun representing a place. Therefore, an auxiliary word such as "at" used together with the noun "White House" becomes the adverbial phrase representing the place. In addition, year 2000 or 2 o'clock is a noun representing time. Therefore, when an auxiliary word such as "at" is used together with a noun, it becomes an adverbial phrase representing the time.

As described above, it is possible to retrieve the information using a concept representing the whole sentence. That is, the retrieving accuracy is improved.

The embodiments of the present invention will be described more in detail hereinafter. The coding and retrieval method according to the present invention relates to a word code composed of a plurality of basic words.

For example, since it is impossible to understand the meaning of the word "special letter" itself, it can be represented as "a symbol representing a language or a word which is different from a common language or a word". Therefore, using the above described coding rule, it can be coded as "common(com)(as), different(dif)(adj), language(lan) or(or), language(lan)(oabj), representing(express, exp)(adj), symbol(mark, mar)=com-as-dif -adj--lan-or-lan-obj-exp-adj—mar".

Here, the meaning of the "special letter" is suggested in the word "symbol", so a main word is the "symbol". The code of the meaning word is the main-constituting word code, and other words become the sub-constituting word codes. However, the codes representing the part of speech such as "obj", "adj" and conjunctions such as "or" and "and" are not included in the sub-constituting word codes. That is, when a code of a word is "(1)-adj-(2)-(3)-(4)" and the meaning word is (4), the main-constituting word code becomes "(4)" and the sub-constituting word codes become "(1), (2), (3)".

As described above, the concept of the information is classified into the basic words according to the above-described rule and stored in the database 132. The coding method of the present invention can be applied to translation programs where a variety of sentences require coding.

Figure 2:
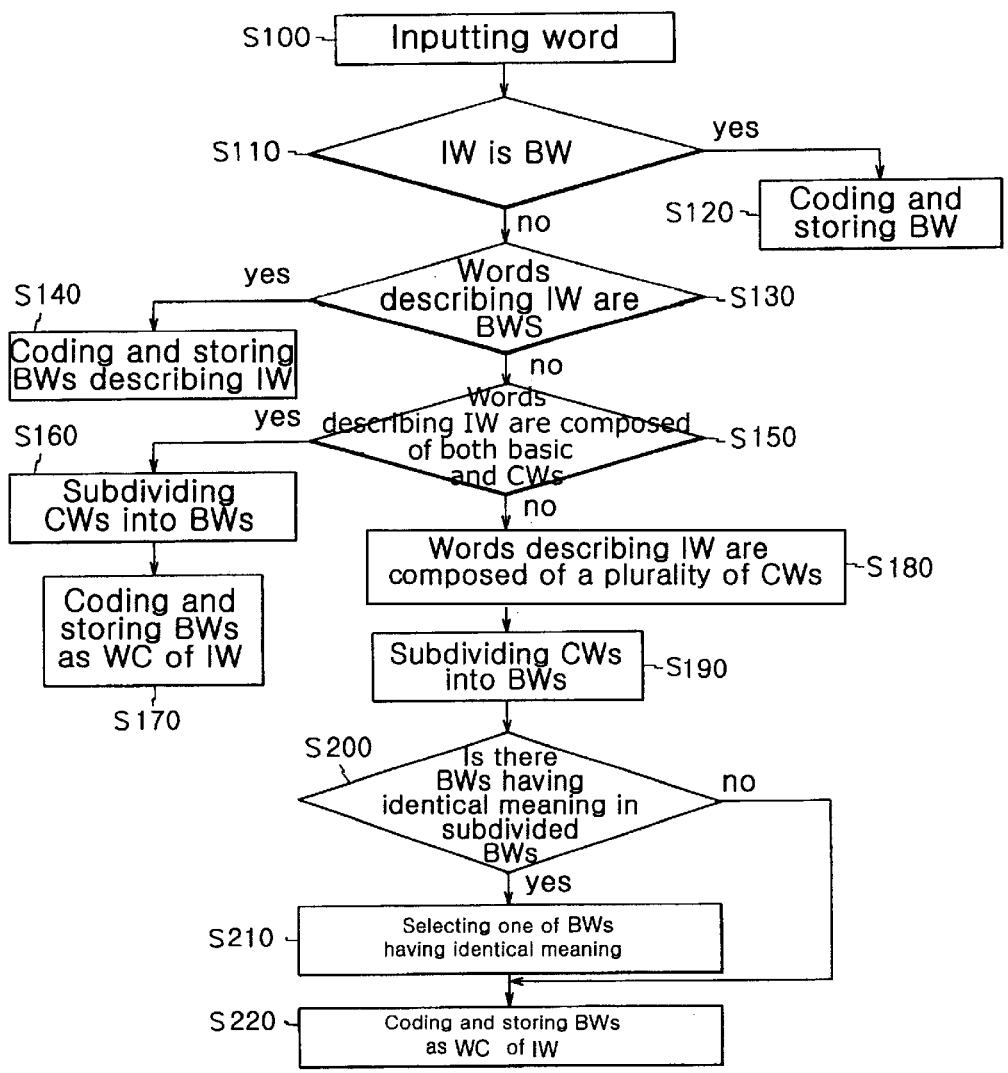
FIG. 2 is a flowchart illustrating an information coding and storing method according to a first embodiment of the present invention.

FIG. 2 shows a flowchart illustrating an information coding and storing method according to a first embodiment of the present invention.

In this embodiment, basic words are selected by classifying the words, and then the selected basic words are coded according to the above described rules. The codes of basic words are stored in the word database 132. For the convenience of description, a word code list where the selected word codes are listed is made. In addition to the basic word list, a word list where words describing meanings of words which are not selected as the basic words is also stored in the word database 132. On the basis of these lists, other words are coded.

As shown in FIG. 2, when an information word is input through the input part 11 of the system 10, the central process unit 12 retrieves the word code list stored in the word database 132 to determine if the input word (hereinafter, referred as IW) is a basic word (hereinafter, referred as BW) (S100~S110). When the input word is a basic word, the data process part 122 of the central process unit 12 codes the input word as a word code(hereinafter, referred as WC) and stores the same in the word database 132 (S120). For example, when a word "hand" is input, since the word "hand" is a basic word, it is coded as a corresponding code on the basis of the word code list.

When the input word is not a basic word, the input word is coded according to descriptive words on the basis of the word list stored in the word database 132. That is, the data process part 122 stores the input word as a word code on the basis of the word code list when the all of the words of the descriptive sentence for the input word are basic words (hereinafter, referred as BWs) (S130~S140).

However, when all words describing the input word is not the basic word but includes a compound word (hereinafter, referred as CP), the compound word is subdivided into basic words, then the input word is coded (S150~S190).

During the subdividing process of the compound word, when basic words may be duplicated, only one basic word is selected (S200~S210).

After the compound word is subdivided as a basic word, the data process part 122 codes the basic words on the basis of the word code list and stores the same in the word database 132 (S220).

For example, in the words "the White House", the White House means the Presidential residence. That is, "the White House" is a compound word including a basic word "President" and a compound word "residence". In the compound word "residence", it is subdivided as basis words "house where a high-ranking officials are living". Therefore, the input word "White House" can be represented as "a house where a president and high-ranking officials are living".

At this point, the president is a high-ranking official, the words "high-ranking official" may be omitted. Therefore, the input word "White House" can be code as "usa-pre-su-liv-adj—hou" corresponding to the descriptive sentence "a house where the president of the United States of America is living", and then stored in the word database 132.

Figure 3A:
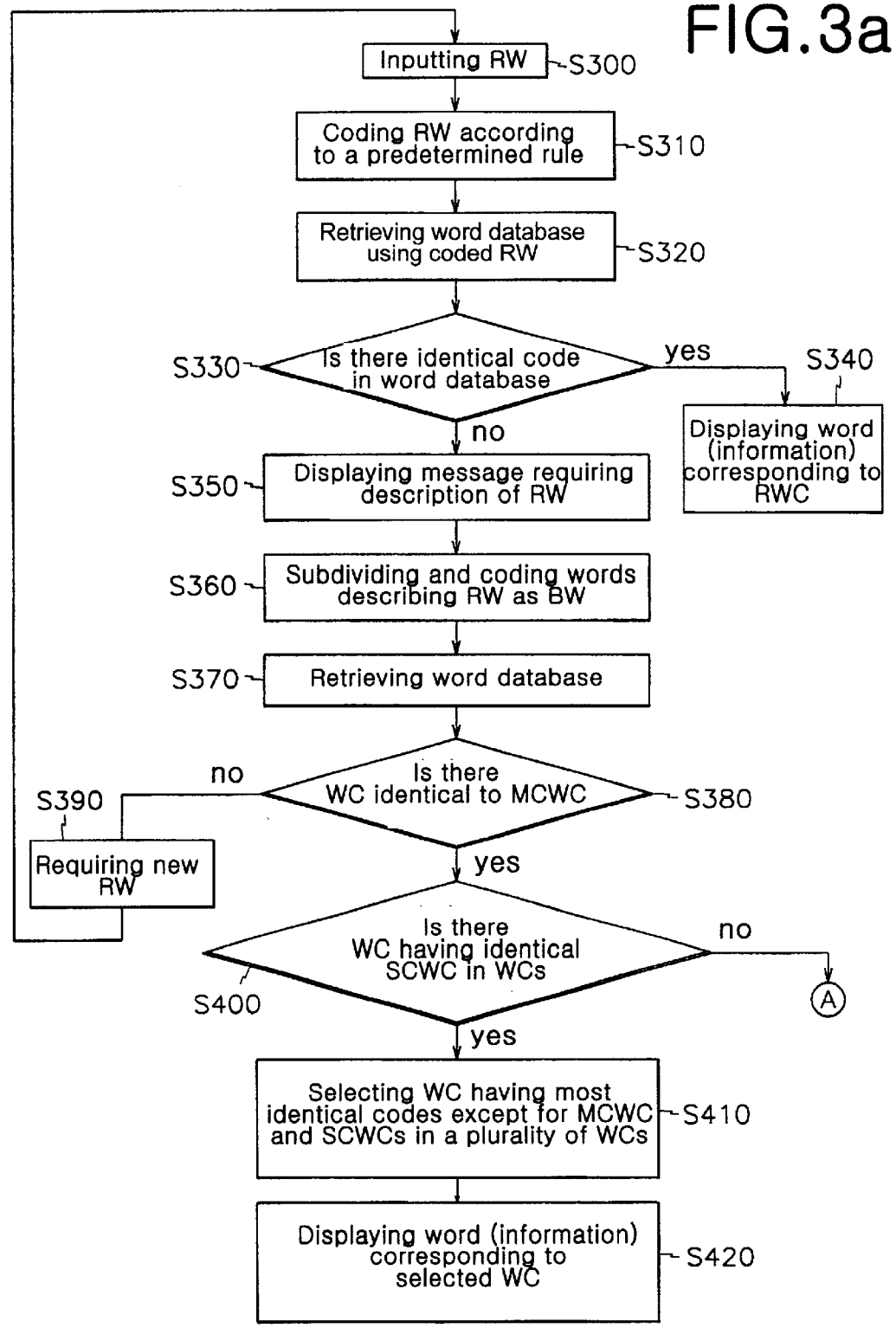
FIGS. 3a and 3b are flowcharts illustrating an information coding and retrieval method according to a first embodiment of the present invention.
Figure 3B:
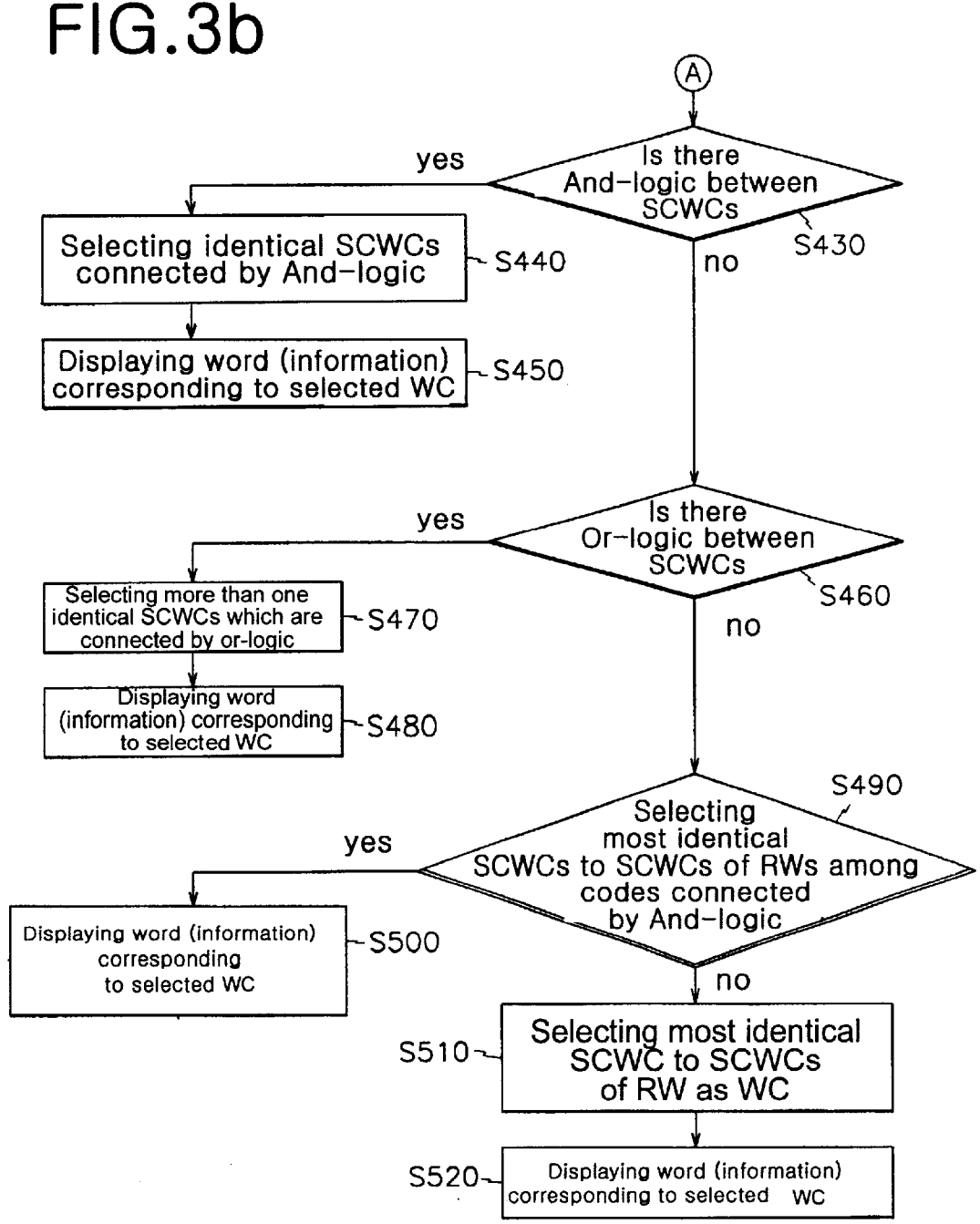

Now a retrieval method using the stored data will be described hereinafter. FIGS. 3a and 3b show a flowchart illustrating a retrieval method according to a first embodiment of the present invention.

As shown in FIG. 3a, when a retrieval word(hereinafter, referred as RW) is input through the interface part 15 via the input part 11 or the user information input system 30, the data process part 122 of the central process unit 12 codes the input retrieval word according to the identical rules when storing the word in the word database 132. For example, when the word "White House" is input, it is coded as "usa-pre-su-liv-adj—hou", and the data retrieval part 123 retrieves the word database 132 on the bases of the coded retrieval word (S300~S320).

When there is a code corresponding to the retrieval word in the word database 132, the data retrieval part 123 of the central process unit 12 displays the information of the retrieval word through the display 14 (S330~S340).

In addition, when there is not code corresponding to the retrieval code in the word database 132, a message requiring the input of the description of the retrieval word is displayed on the display 14 or the user information input system. Therefore, when a descriptive sentence corresponding to the retrieval word is input through the input part 11 or the interface part 15, the data process part 122 of the central process unit 12 subdivides the words of the descriptive sentence and codes the words according to the above described coding method (S350~S360). At this point, the coded words include main-constituting word codes (hereinafter, referred as MCWCs) and sub-constituting word codes(hereinafter, referred as SCWCs).

On the basis of the coded words, the word database 132 is retrieved. That is, the data retrieval part 123 retrieves the word database 132 to search for a corresponding main-constituting word code to the retrieval word code (hereinafter, referred as RWC) (S370). When there are no corresponding main-constituting word codes, a message for requiring the input of a new word is displayed on the display 14(S380~S390).

In addition, when there are corresponding main-constituting word codes (first word codes), it is retrieved that if there are word codes ("second word codes") having sub-corresponding constituting word codes to sub-constituting word codes of the retrieval word codes in the corresponding main-constituting word code (S400).

When there are the second word codes having the corresponding sub-constituting word codes, a word code having many corresponding part of speech codes is selected among the second word codes(S410). Finally, the selected word code is displayed on the display(14) (S420).

In addition, when there is no second word code among the first word codes, the information retrieval is performed as shown in FIG. 3b. That is, the information retrieval is performed according to whether there are codes "or" and "and" in word codes represented by a plurality of basic words so as to improve the retrieval efficiency.

That is, word codes (hereinafter, referred as WCs)having a "and" code are first retrieved among the first word codes, then word codes having the corresponding sub-constituting word codes to those of the retrieval word code are selected, and information of the selected word codes is displayed on the display 14(S430~S450).

In addition, when there are not "and" word codes, it is retrieved if there are "or" word codes. When there are "or" word codes, word codes having at least one corresponding sub-constituting word codes to those of the retrieval word code are selected, and information of the selected word codes is displayed on the display 14 (S460~S480).

When there are not word codes satisfying the condition of steps S430 and S460, the sub-constituting word codes connected by the "and" code being most similar to the sub-constituting word codes of the retrieval codes is selected among the first word codes, and information of the selected word code is displayed on the display (S490~S500).

The most identical information may include both the main-constituting word code and the sub-constituting word code. For example, when a word code is "(1)-(2)-(3)", sub-constituting word codes are (1) and (2), and the main-constituting word code is (3), a code having a word code "(5)-(6)-(1)-(2)-(3)" can be selected.

However, there is no word code including either "and" or "or" code in the first word codes, a word code having the most sub-constituting word codes corresponding to the sub-constituting word codes of the retrieval word code is selected, and information of the selected word code is displayed on the display 14 (S510~S520).

As described above, by retrieving the retrieval code by dividing it into main-constituting word codes and sub-constituting word codes, more accurate information can be retrieved.

Now, an information coding and retrieval method according to a second embodiment of the present invention will be described hereinafter.

In this second embodiment, the input retrieval sentences are differently coded according to the number of words and stored in the word database. Since the system for coding and retrieving the information is identical to that of the first embodiment, a detailed description thereof will be omitted herein.

When the number of input word is one, the word is coded according to whether it is a basic word or not. That is, when the input word is the basic word, it is coded on the basis of the word code list, and when not the basic word, it is coded on the basis of the descriptive sentence of the input word.

However, when the number of input words is two, the input words are coded according to its input order, while using a special code such as ":" to differentiate between the input words.

For example, when the input word is "Kyungsangdo(the Korean word) high-ranking official residence", a code of the "Kyungsangdo" is "kyu", and a code of the "high-ranking official residence" is "hig-adj-sit-in-be-adj-off—su-liv-adj—hou", then the input word "Kyungsangdo high-ranking official residence" is coded as "kyu:hig-adj- sit-in-be-adj-off—su-liv-adj—hou".

When the number of input words is more than two, the input words are coded in the above described method and each word is differentiated by the code ":". At this point, when the input sentence is a negative sentence, a symbol such as (−) representing this fact can be used in coding the input sentence. For example, when the input sentence is a past-tense sentence, a code "pa" is used, when a present-tense sentence, a code "pr" is used, and when a future-tense sentence, a code "fu" is used.

In addition, the order of the input words can be on the basis of any language. When the input words constitute a sentence, the order of words should be considered.

In this second embodiment, it is determined if each of the input words is a basic word, and as in the first embodiment, if there are any compound words, they are subdivided into basic words, and then coded.

Figure 4:
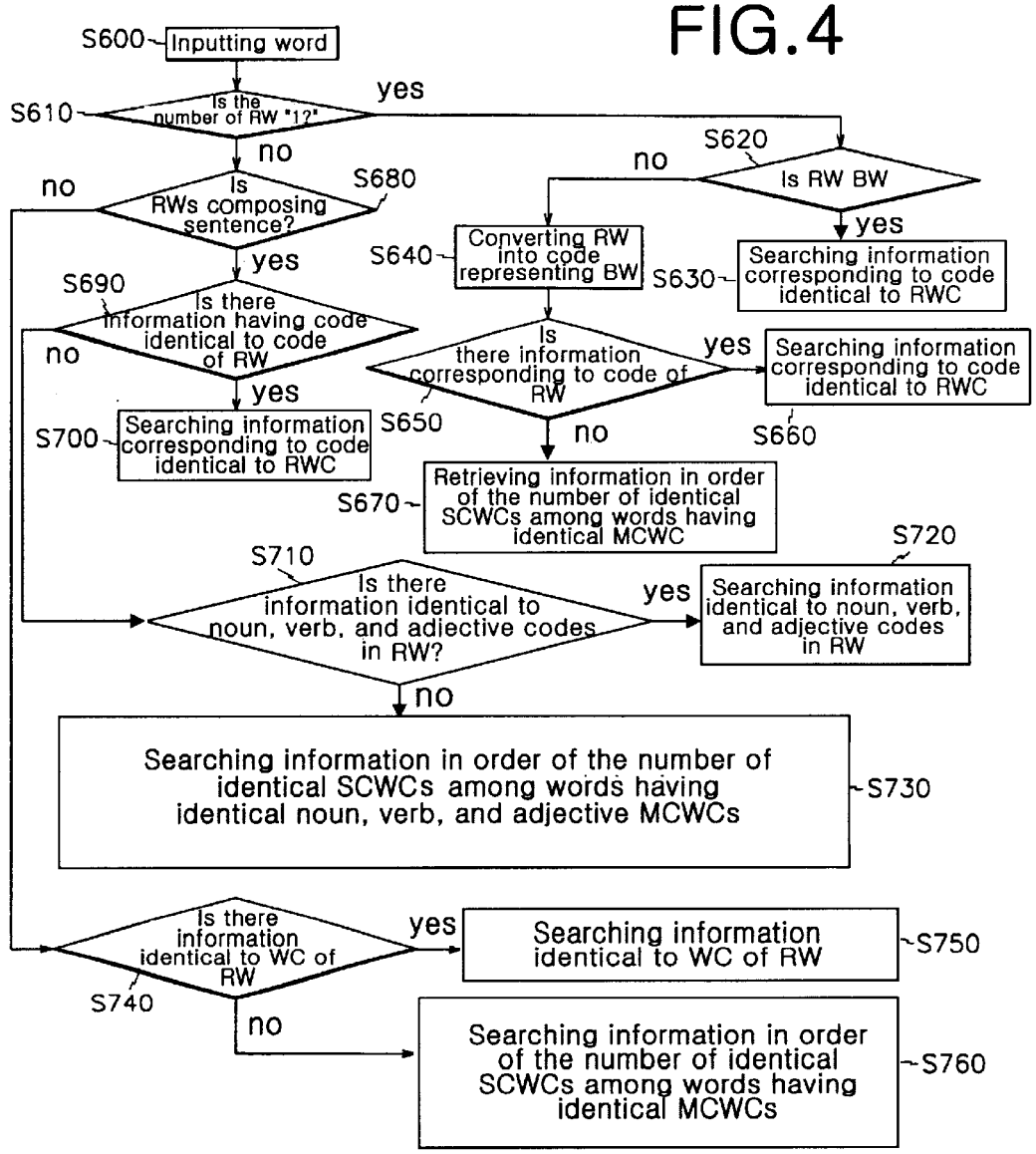
FIG. 4 is a flowchart illustrating an information coding and retrieval method according to a second embodiment of the present invention.

FIG. 4 shows a flowchart illustrating an information retrieval method according to a second embodiment of the present invention. In FIG. 4, when a retrieval word(s) input through the input part 11 or the interface part 15, the central process unit 12 first determines if the number of retrieval word is one(S600~S610). When the number of retrieval word is one, it is determined if the retrieval word is a basic word (S620). When the retrieval word is a basic word, it is coded as a word code, and a code corresponding to the coded word is searched in the word database 132 (S630).

However, when the number of retrieval word is one, and the retrieval word is not a basic word, the retrieval word is subdivided into the basic words and coded, after which the word database 132 is retrieved on the basis of the coded words (S640~S650). In addition, when there is not a word code identical to the retrieval word, as in the first embodiment, the retrieval word is divided into main-constituting word codes and sub-constituting word codes, a word identical to the main-constituting word code is first searched and then a word code having the most sub-constituting word codes identical to those of the retrieval word is searched (S670).

In addition, in step S610, when the number of retrieval words is more than one, it is determined if the retrieval words composes a sentence (S680), and when the retrieval words is a sentence ("retrieval word sentence"), the retrieval words are subdivided and coded.

Next, on the basis of the coded retrieval word sentence, the word database 132 is retrieved to search codes identical to the words of the retrieval word sentence(S690~S700). When there is no identical code in the word database, parts of speech of the words of the retrieval word sentence are retrieved. That is, identical parts of speech are compared with each other. In this embodiment, as described in the first embodiment, since codes representing the part of speech are assigned to the sentence during the coding process, the part of speech can be easily compared.

Accordingly, when there is no word code having an identical part of speech to the that of the word code in the retrieval word code, a word code identical to the code of the word of the retrieval word sentence is searched without considering the part of speech (S710~S720).

That is, when a word code of the word "love" is "lov", and a word code of the word "do love" is "lov-ver", the codes "lov" and "lov-ver" are considered as an identical code regardless of the part of speech.

In addition, when there are no identical word codes of the retrieval word code in the code list even when the part of speech is not considered, as in the first embodiment, a sentence having an identical main-constituting word codes and the most identical sub-constituting word codes is searched (S730).

When there is a negative sentence identical to the retrieval word sentence, the negative sentence is searched.

In addition, in Step S680, when the number of retrieval word is more than one, but the words do not compose a sentence, the retrieval words are coded in basic words, and information having word codes identical to the coded basic word is provided(S740~S750), and when there are not identical word codes, information having a main-constituting word code and the most sub-constituting word codes identical to those of the retrieval words is provided (S760).

Command words for operating a variety of computer programs can be coded according to the above-described coding method of the present invention and stored in the word database. When the command words are input as retrieval words, word codes identical to the input command words can be retrieved, and the computer is automatically operated according to the input command words.

When setting the system in which a program is automatically operated, the user inputs a plurality of words representing the program to be operated instead of the command words for operating the program. The input words are coded and the processor retrieves the codes, identical to the input words, from the word database and operates the program according to the retrieved command code.

Figure 5:
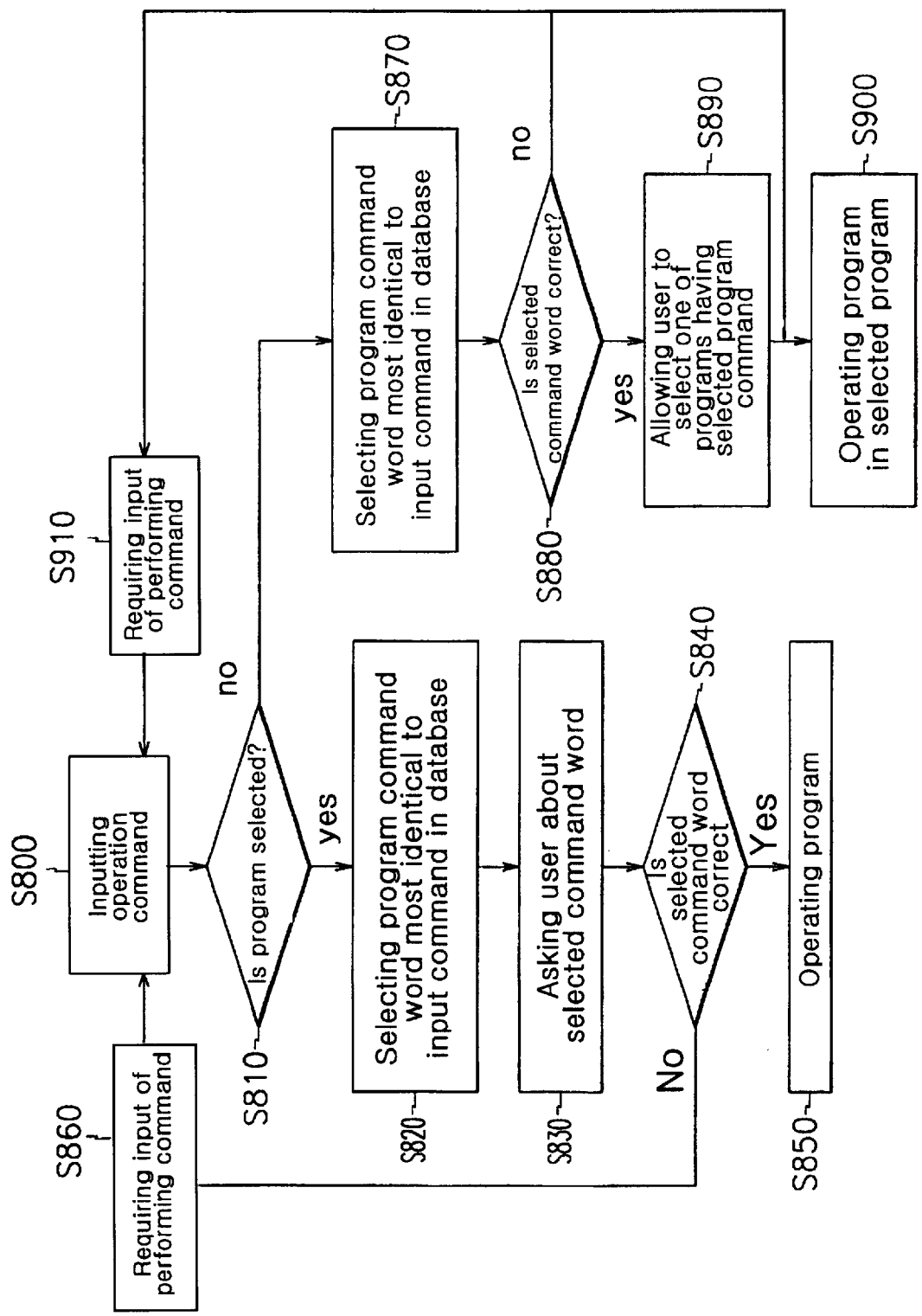
FIG. 5 is a flowchart illustrating an information coding and retrieval method according to a third embodiment of the present invention.

FIG. 5 shows a flowchart illustrating a process for operating a program using the information coding and retrieval method according to a third embodiment of the present invention.

As shown in FIG. 5, computer program command words are coded according to the above-described method and stored in the command database. When a user inputs operation command words and selects a program to be operated (S800~S810), the input command words are coded as described above, and the command database is retrieved to search a program command word which is the most similar to the input operation command words(S820). Next, the searched program command word is displayed so that the user can determine if it is the command word he/she wants, and when it is determined that the searched program command word is the word the user wants, the program corresponding to the command word is operated(S830~S850). When the searched command word is not the word the user wants, a new command word is input (S860).

In addition, when the user does not select a program to be operated, the database is retrieved on the basis of the operation command words coded in step S820 and an identical program command word is selected (S870), after which it is identified that the selected command word is the word the user wants to operate (S880). When there are a plurality of programs corresponding to the selected command word, the user selects a program operated by the selected command word(S890), and the program is operated according to the command word (S900). When there is no program the user selected, retrieval words are input again (S910).

The system 10 of the present invention can be connected to the internet 20 as shown in FIG. 1 so as to be used as a website providing an information retrieval service. When a user connects to the website through the internet 20 using an information input system 30, the system 10 can perform the information retrieval operation, and the retrieved information is provided to the information input system 30 through the internet 20.

In the present invention, a processor and a database can be installed in the client system 30 so that the user can perform the coding operation by him/herself to improve the retrieval accuracy and speed. At this point, the central process unit 12 of the system retrieves the information corresponding to the word code by searching a plurality of information coded in the database without performing a special coding operation.

Figure 6:
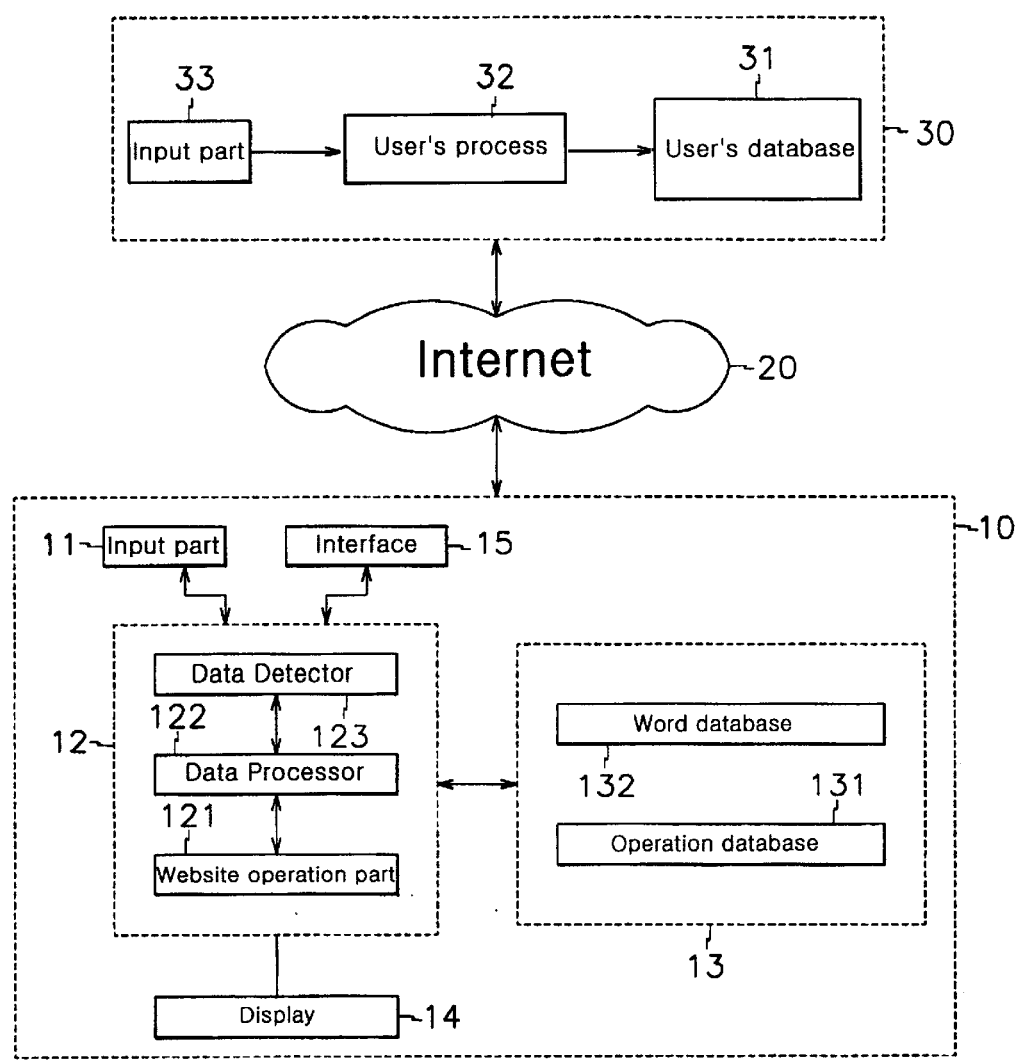
FIG. 6 is a block diagram of an information coding and retrieval method according to a fourth embodiment of the present invention.

FIG. 6 shows a system where the client system 30 and the database are installed according to a fourth embodiment of the present invention.

The system 10 of the fourth embodiment is identical to that of the first embodiment except that there are further provided a user processor 12 for coding retrieval words input to the client system 30 into basic word codes and transmitting the same to the central process unit 12 of the system, a user database 31 in which word code list used for coding the input words is stored, and an input part 33.

Figure 7:
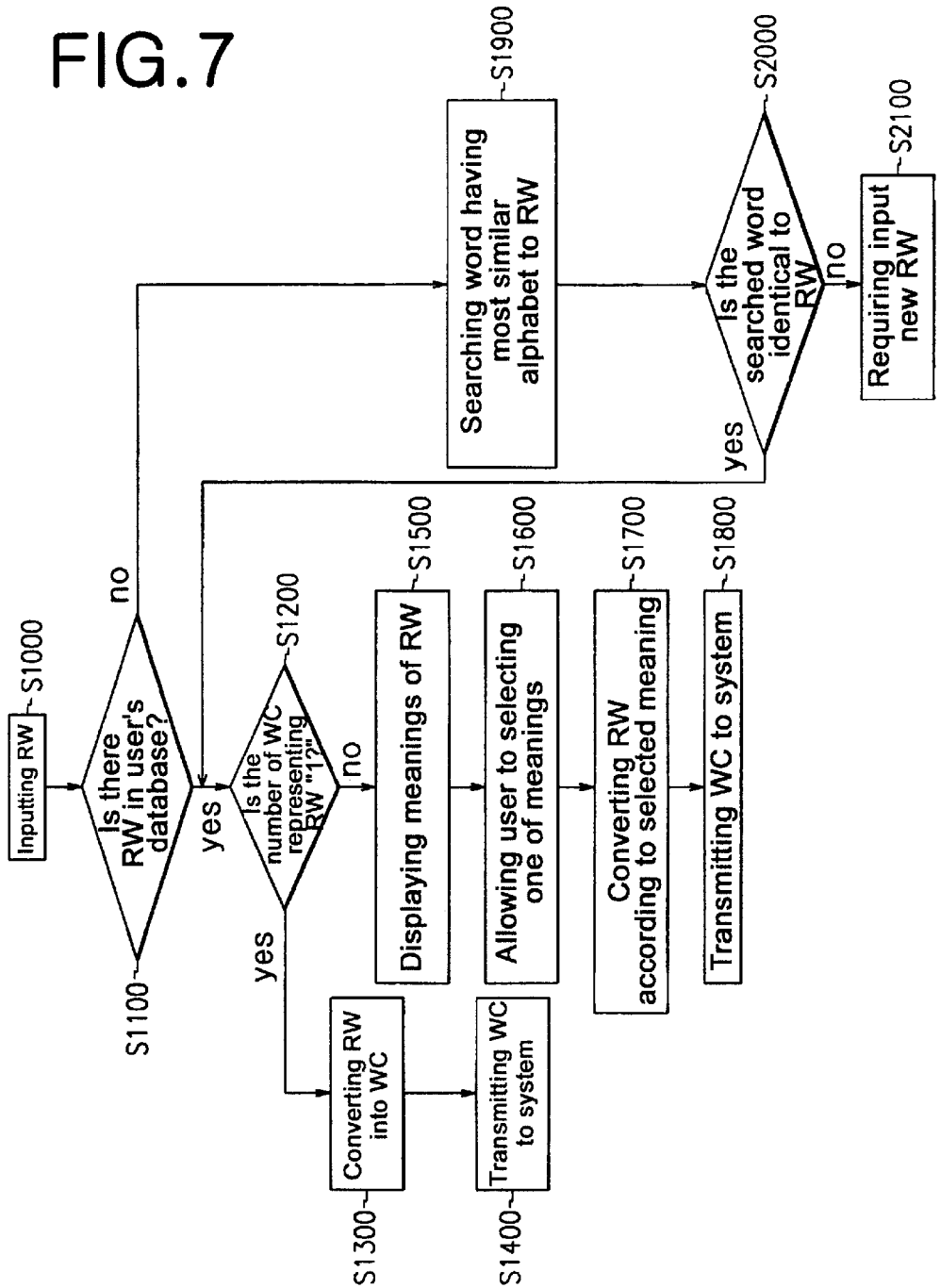
FIG. 7 is a flowchart illustrating an information coding and retrieval method according to a fourth embodiment of the present invention.

FIG. 7 shows a flowchart illustrating an information retrieval method according to a fourth embodiment of the present invention.

When a user inputs retrieval words through the input part 33 of the information input system 30, the client processor 32 determines if there are word codes corresponding to the input retrieval words in the client database 31 (S1000~S1100). When there are the word codes in the client database 31 and the number of word code is one, the retrieval code is coded as in the first embodiment, after which the coded retrieval code is transmitted to the system 10 through the internet 20 (S1200~S1400). Accordingly, the central process unit 12 retrieves the database on the basis of the transmitted word code without performing the coding operation and transmits the retrieved information to the client system 30.

When the input retrieval word has more than two meanings, the meanings of the input retrieval word are displayed on the display so that the user can selected one of them(S1500~S1600). The selected word is converted into a code corresponding to the meaning of the selected word, and then transmitted to the system through the internet 20 (S1700~S1800).

In addition, when the input retrieval word does not exist in the client database 31, the user processor 32 analyzes the letters of the input word and searches a word having the most similar letters in the client database (S1900). The searched word is displayed so that the user can determine if the word is a word he/she wants (S2000). When the word is a word he/she wants, it is determined that the number of word code of the word is one or more and the word is coded, after which the coded word is transmitted to the system 10 through the internet.

However, when the searched word is not the word the user wants, a message requiring the input of a new retrieval word is displayed on the display (S2100). When the new retrieval word is input, the above described steps are repeated (S1100~S2000). As described above, since the user processor 32 and user database 31 are installed in the client system 30, the retrieval speed can be improved.

In addition, when there is no retrieval word in the client database 31, the retrieval word may be coded using the word database 132 of the system or a descriptive sentence of the retrieval word can be input again.

When the word code transmitted from the client system 30 is not stored in the word database 132 of the system 10, the system 10 transmits a message requiring the input of a new retrieval word to the client system 30.

In the above-described embodiments, although the input words are retrieved according to their meanings, if required, the information can be retrieved by using the input words as they are.

For example, when a website "Heaven of Stars" is retrieved, it will be preferable to use the words "Heaven of Stars" as is rather than to use the meanings of "Heaven" and "Star". Therefore, the system can be designed such that the user can select either the word retrieval method and the word code retrieval method.

When the word code retrieval method is selected, the meanings of the input words are represented as basic words, then converted into word codes. At this point, the basic words are displayed on the display so that the user can select some of the basic words so that the more simplified retrieval field can be defined on the basis of the selected basic words.

In the above-described embodiments, it is also possible to make a map having information fields and detailed field according to the information fields so that the user can retrieve the information by selecting the information field and the detailed field displayed on the map.

Figure 8:
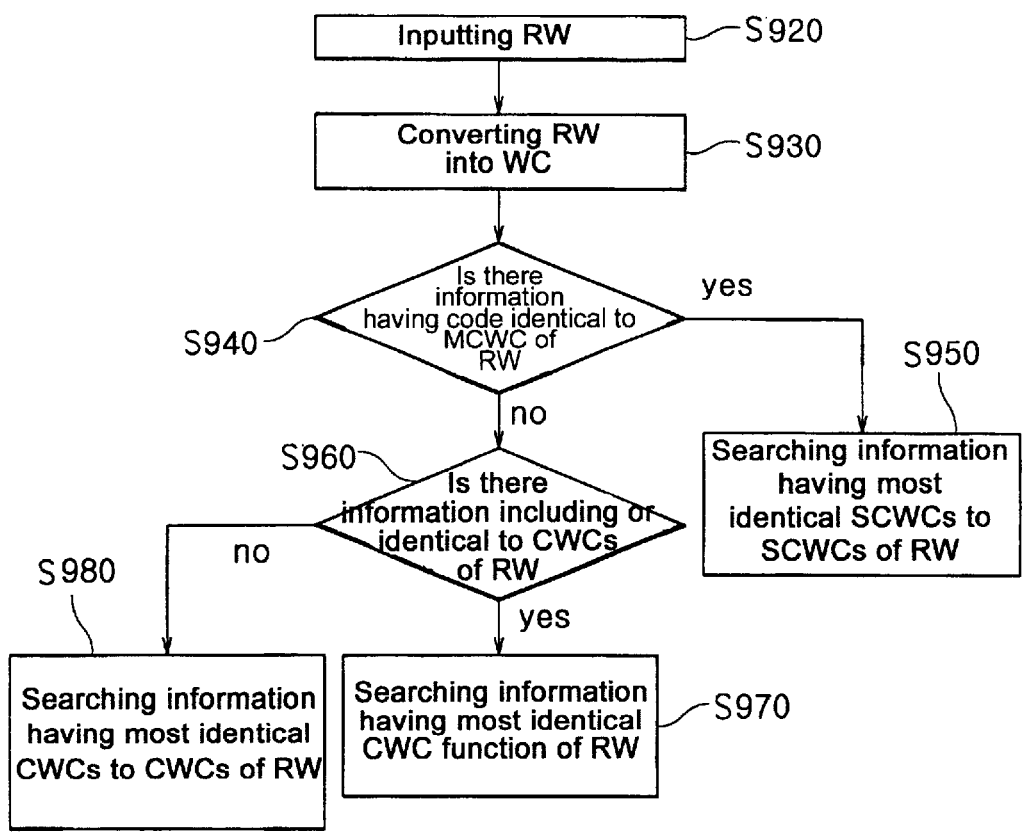
FIG. 8 is a flowchart illustrating an information coding and retrieval method according to a fifth embodiment of the present invention.

FIG. 8 shows such an information retrieval method according to a fifth embodiment of the present invention.

When retrieval words are input through the input part 11 or the interface part 15, the data process part 122 codes the retrieval words into word codes according to the above described coding rules (S920~S930), then an information having a main-constituting word code identical to the main-constituting word code in the retrieval words is searched through the word database 132. Next, when such information exists in the word database 132, information having the most sub-constituting word codes identical to sub-constituting word codes of the retrieval word codes is searched (S940~S950).

When there is no information having the main-constituting word codes identical to those of the retrieval words, information having word codes identical or including the constituting word codes(hereinafter, referred as CWCs) of the retrieval word is searched (S960~S970). At this point, even if the number of the retrieval word is one or more than two words composing a sentence, the information is searched in the same method. Here, the constituting word codes include the main-constituting word codes and sub-constituting word codes of the retrieval words.

To improve the retrieval accuracy, information which is the most identical in its function in the constituting word codes is selected.

For example, when constituting word codes of the retrieval word is "(1)(2)(3)(4)(5):(6)(7)(8)(9):(10)(11)(12)(13)(14)", in identical in its function in the constituting word codes is selected. In addition, when there is no information including all of the constituting word codes of the retrieval words or having word codes identical to the constituting word codes of the retrieval words, information having constituting word codes most identical to the constituting word codes of the retrieval words is searched(S980). Accordingly, even if there is not information identical to the main-constituting word codes of the retrieval words, desired information can be searched by using the above described retrieval method.

In the retrieval method of FIG. 8, steps S940 and S950 may be omitted. At this point, step S960 for determining if there is information including or identical to all of the constituting word codes is performed after the retrieval words are converted into word codes.

The function of the constituting word code includes a word functioning as a verb or an adverbial phrase. Since the position of the constituting codes of the word codes relates to the function, it can be noted in the present invention that when the codes are the identical constituting word code and in the same position, it is determined that the functions thereof will be identical.

The retrieval method of FIG. 8 can be employed when the retrieval words compose a sentence. That is, information most identical to the constituting word codes of the sentence can be searched. When the retrieval words compose a sentence and the word codes of the sentence are assigned with functioning codes, the most identical information is searched while considering the functioning codes and word codes. That is, information having an identical functioning code and the most identical word codes should be primarily retrieved, information identical to the main-constituting word codes and other word codes of other words should be secondary retrieved, and information most identical to the constituting word codes should be thirdly retrieved without considering the functioning codes.

When there is a word with a multiple meaning, an algorithm for coding the word is required. A method for coding such a multiple meaning word(hereinafter, referred as MMW) as word codes will be described hereinafter.

For example, the Korean word "Nun" has two meanings, i.e., "eye" and "snow". When a word is a multiple meaning word having more than two word codes, an inventive method for coding the multiple meaning word is required.

Therefore, in the present invention, constituting word codes of the multiple meaning word are first compared with constituting word codes of other words, and then one word code among the more than two word codes of the multiple meaning word is selected. The multiple meaning word is coded as the selected word code. When the multiple meaning word is compared with the constituting word codes of other words, other words are selected in the identical sentence, in retrieval words composing one logic, or closer word to the multiple meaning word.

For example, when coding the sentence "size of a methane Bunja (the Korean word) which is a chemical material", since "methane" is a chemical material and a proper noun, a word code "ct" representing the chemical field and a code "C" representing the proper noun are assigned. Therefore, the word code of "methane" becomes "ctmethane(C)". The word code of "size" becomes "sz".

Since the Korean word "Bunja" has two meanings, molecule and numerator, which are used in a chemical field and a mathematical field, there are two word codes for the Korean word "Bunja". That is, the "Bunja" in the chemical field means a small basic material forming a chemical material and formed of atoms. Since generic words extracted from the meaning becomes "(chemistry, ct), (material, mt), (form, fm), (small(sl), basic(bs), material (mt)), and (atom, ao)", the word code becomes "ctmtmtbssl=fm-fao".

In addition, "Bunja" in the mathematical field means a part for dividing a whole number. Since generic words of the meaning becomes "(mathemathics, mm), (whole, wl), (number, nb), (divide,dd), and (part,pt)", the word code of "Bunja" used in the mathematical field becomes "mmpt=ddnbwl".

Accordingly, the possible codes of "size of a methane Bunja (the Korean word) which is a chemical material" can be one of the following two codes.

1. ct mt ctmethane(C) ctmtmtbssl=fm-fao sz
2. ct mt ctmethane(C) mmpt=ddnbwl sz

In the present invention, constituting word codes of the word codes of multiple meaning words are compared with constituting word codes of other words, and one of more than two word codes of multiple meaning words is selected. The multiple meaning word is coded as the selected code.

That is, in No. 1 code, a field code "ct" also exists in a word code of "methane" and a constituting word code "mt" of the "Bunja" exists in a constituting word code of "material". However, in No. 2 code, a constituting word code identical to a constituting word code of other word which is not the multiple meaning word does not exist. Therefore, the No. 1 code is selected as a code of the word "Bunja".

As another example, when the stored information or retrieval word is "Bunja(the Korean word) explained(ep) by Avogadro (proper noun, C)", since the word "Bunja" is a multiple meaning word, the word "Bunja" can be coded as follows:

1. Avogadro(C) ep ctmtmtbssl=fm-fao
2. Avogadro(C) ep mmpt=ddnbwl

In this case, since all of the constituting word codes of both Nos, 1 and 2 codes are not identical to those of other constituting word codes of other words, special word codes of the word "Bunja" are compared. In the present invention, one word is represented as one word code. However, since there is a need for describing one word using a sentence, a plurality of words describing the word can be used. In this case, the word is described by its tag. The word "Bunja" in the chemical field can be described as "as a particle composing a material, it can be made by the combination of atoms, is introduced by Italian chemist, Avogadro".

Since the word "combination" means "join(jn) together (tt)", it can be coded as "jntt". Since the word "chemist" means "person (pr) who work chemistry(ct)", it can be coded as "prct". Since the word "introduction" means "make (mk) known(kn) first(fs)", it can be coded as "mkknfs". In addition to these word codes, there are other word codes such as material(mt), compose=form(fm), chemistry(ct), material base small(mtbssl), and atom(ao). Accordingly, when the word "Bunja" can be represented as a special word code which is a tag. That is, the word "Bunja" can be coded as "ma fm mtbssl, mk ao ct intt, ltalian(C) prct Avogadro(C) mkknfi".

At this point, since there is a proper noun "Avogadro, chemist" in the special words, the sentence "Bunja explained by Avogadro" is regarded as a code of a word used in the chemical field.

As described above, in the present invention, when comparing the constituting word codes with the constituting word codes of other words, the constituting word codes composing the special word codes of multiple meaning words in addition to the word codes can be comparable codes. A code for representing a field such as "chemical field" and "mathematical field" can be included in the constituting word codes of multiple meaning words.

FIGS. 9a to 9e show flowcharts illustrating a method for coding multiple meaning words according to a sixth embodiment of the present invention.

As shown in the drawings, input words are first established to code a retrieval word input through the client system 30 or information to be stored in the database as a word code (S3100).

It is determined if there is a multiple meaning word having more than two word codes in the input words (S3110). This determination is performed by the central process unit 12 of the system on the basis of word codes stored in the word database 132. That is, the input words are retrieved in the database 132, and when one word has two word codes, the word is determined to be a multiple meaning word.

When there is no word having more than two word codes, as in the first embodiment, all of the input words are coded as word codes (S3150). When there is a word having more than two word codes, only the words having one word code are coded as word codes (S3120). For example, when the input words are "size of a methane molecule which is a chemical material", since the words "chemical, material, methane, and size" are not multiple meaning words, these words are first coded as word codes.

Next, it is determined that the number of multiple meaning word is one (S3130), and a predetermined order from 1 to n is assigned to word codes of a multiple meaning word (S3140). In the above example, since the word "Bunja" becomes the multiple meaning word having two word codes, and the number of multiple meaning word is one, the word code "ctmtmtbssl=fm-fao" is assigned with No. 1, and the word code "mmpt=ddnbwl" is assigned with No. 2. If the number of word codes is four, the word codes are respectively assigned with Nos. 1, 2, 3, and 4.

Next, a loop of a No. 1 word code to a No. n word code of the multiple meaning word is formed in a program and the number of constituting word codes which are identical to those of other words is set as "kn" (S3200~S3220).

As described above, No. 1 word code of the word "Bunja" is "ctmtmtbssl =fm-fao", and No. 2 word code is "mmpt=ddnbwl". When constituting word codes of No.1 word code are compared with the constituting word codes of another word, the constituting word code of the other word is "ct mt ctmethan(C)", among which the "ct" is identical by two times, and the "mt" is identical by one time. Accordingly, since the total number of identical constituting word codes becomes three, k1 becomes 3. In addition, since there is no identical constituting word code between the constituting word codes of No. 2 word code and the constituting word codes of other word, k2 becomes 0.

As described above, according to the number of word codes of the multiple meaning word, the number of "n" is determined. According to the number of the identical constituting word codes between the constituting word codes from "1" to "$n^{th}$" and the constituting word codes of other word, the number of "kn" is determined. When the numbers of "n" and "kn" are determined, the number "kx" having the highest number among k1 and kn is selected (S3230), then a word cord which has an identical order to the selected "kx"

is selected, after which the multiple meaning word is coded as the selected word code (S3240~S3250).

Since k1 is "3" and k2 is "0", k1 is selected and No. 1 word code having an identical order to the selected "k1". Accordingly, the word code "ctmtmtbssl =fm-fao" which is No. 1 word code of the word "Bunja" is selected as a word code of the "Bunja". In addition, when the word code of the "Bunja" is added to codes of rest words in Step S3120, all of the input words are coded as a word code (S3260). That is, the input words "size of methane molecule which is a chemical material" are coded as "ctmethane(C) mt ctmtmtbssl=fm-fao sz".

Figure 9A:
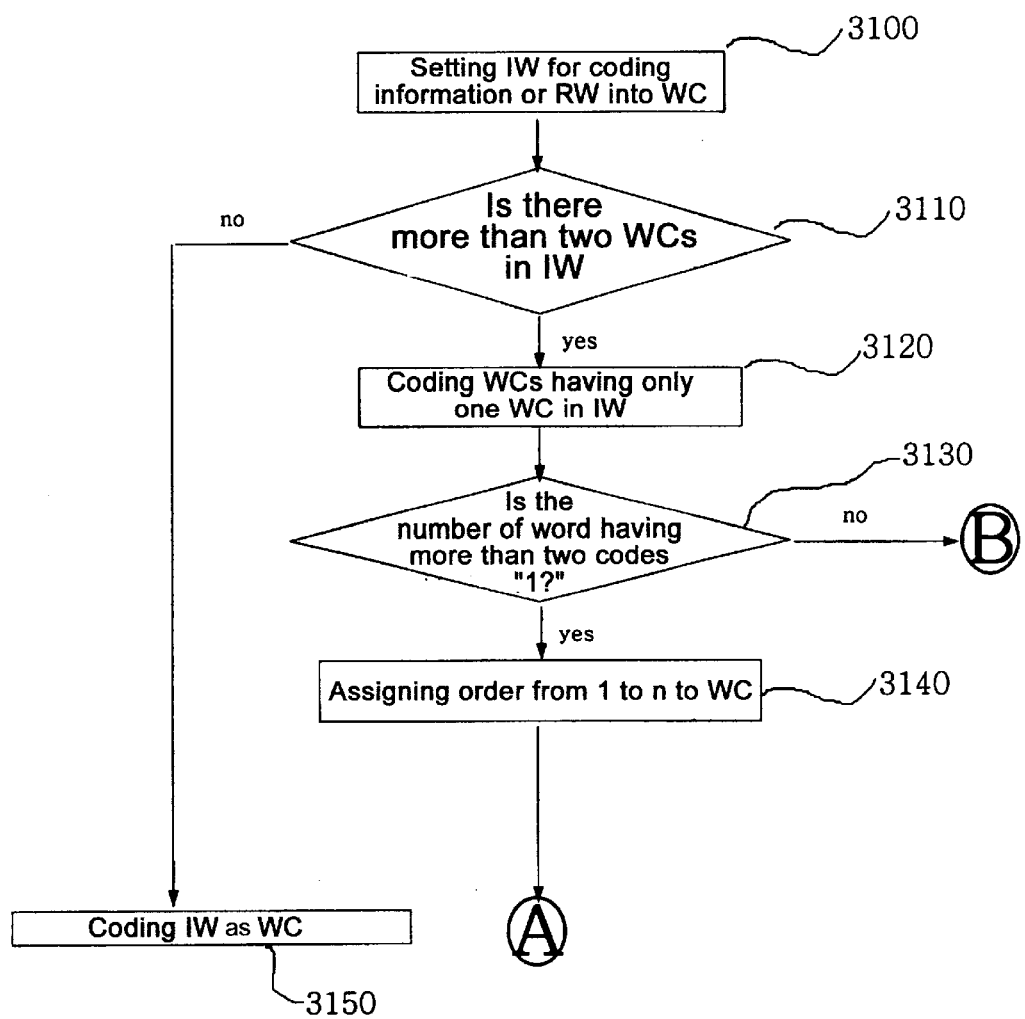
Figure 9C:
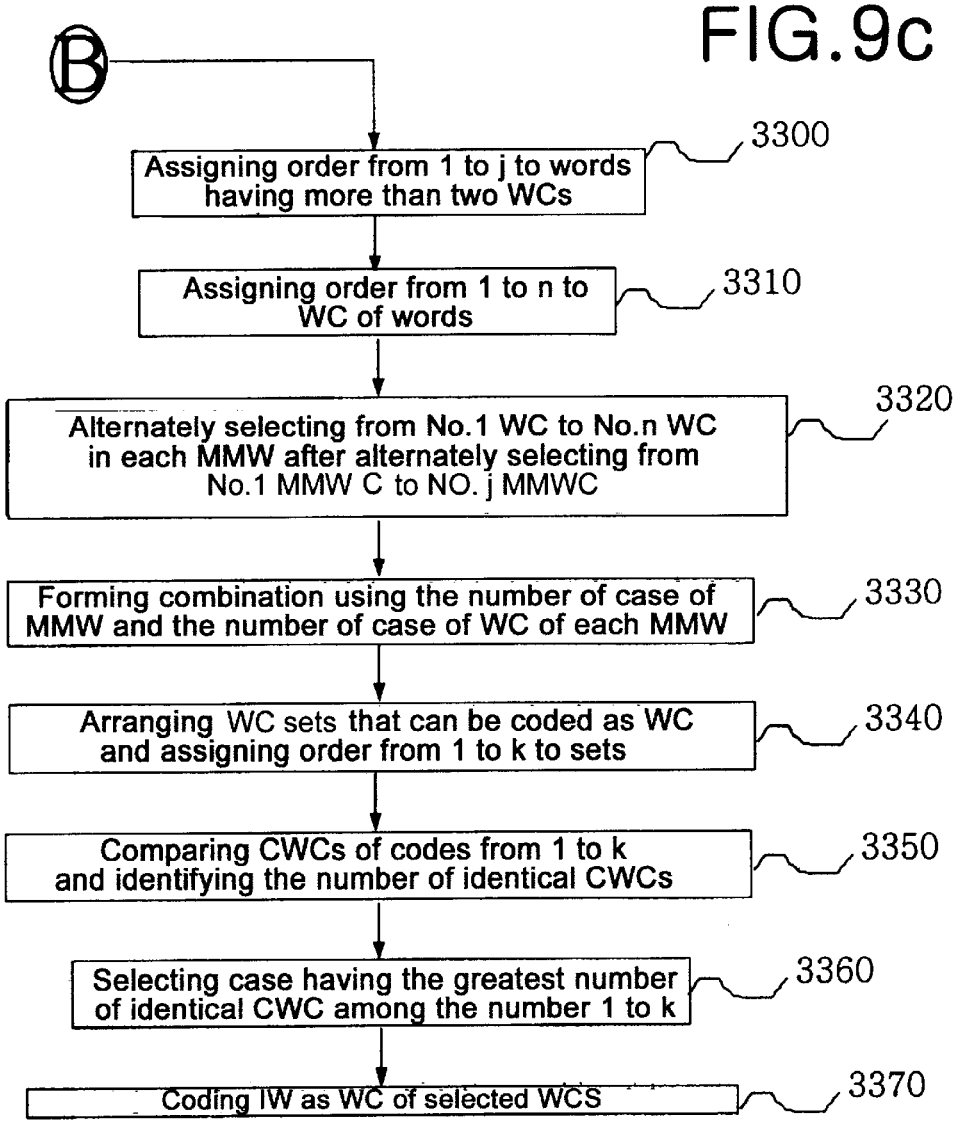

FIG. 9c shows a flowchart illustrating a coding method when the number of multiple meaning words is more than two.

When the number of multiple meaning words is more than two, Nos. from "1" to "j" are orderly assigned to the multiple meaning words, and Nos. from "1" to "n" are orderly assigned to the word codes of the words assigned with the Nos. from "1" to "j" (S3300~S3310).

When input words in case of "a No. 1 multiple meaning word (the number of word code is "3"), a No. 1 normal word, No. 2 multiple meaning word (the number of word code is "2"), a No. 3 multiple meaning word (the number of word code is "4"), and a No. 2 normal word" will be described as an example hereinafter.

When the number of multiple meaning word is "3", Nos. 1 to 3 are respectively assigned to the multiple meaning words, and since each of the multiple meaning words has more than two word codes, an order from No. 1 to n is assigned to the word codes. That is, when word codes of the No. 1 multiple meaning word are "(1)(2)(10)(20)(20)", "(22)(23)(24)(25)", and "(30)(35)(36)(38) (40)(41)", the word code "(1)(2)(10)(20)(20)" is assigned with a No. 1 word code, the word code "(22)(23)(24)(25)" is assigned with a No. 2 word code, and the word code "(30)(35)(36) (38)(40)(41)" is assigned with a No. 3 word code.

In the No. 1 word code "(1)(2)(10)(20)(20)", each parenthesis stands for one constituting word code, the Arabic numbers in the parentheses are introduced for the convenience to discriminate the basic words representing the constituting word codes.

Likewise, the No. 2 multiple meaning word and the No. 3 meaning word are assigned with an order.

As in the above, when an order is assigned to the multiple meaning words and word codes, all of the word codes can be identified by the No. code. For example, a word code of a multiple meaning word can be called as nth word code of a No. j multiple word.

Next, after alternately selecting multiple meaning words from No. 1 to J, by alternately selecting word codes from No. 1 to n of each multiple meaning word, a combination of number of cases that can be made by the number of multiple meaning words and the number of word codes is set. All of the word code sets where input words can be coded as word codes are arranged, and each of the word code sets (hereinafter, referred as WCSs) is assigned with an order from No. 1 to k (S3320~S3340).

In the above example, since the number of combination of the word codes is 24, the word code sets where the input word can be coded becomes 24 as follows:

1) a No. 1 word code of a No. 1 multiple meaning word, a No. 1 normal word code, a No. 1 word code of a No. 2 multiple meaning word, a No. 1 word code of a No. 3 multiple meaning word, and a No. 2 normal word.

2) a No. 1 word code of a No. 1 multiple meaning word, a No. 1 normal word code, a No. 1 word code of a No. 2 multiple meaning word, a No. 2 word code of a No. 3 multiple meaning word, and a No. 2 normal word.

3) a No. 1 word code of a No. 1 multiple meaning word, a No. 1 normal word code, a No. 1 word code of a No. 2 multiple meaning word, a No. 3 word code of a No. 3 multiple meaning word, and a No. 2 normal word.

4) a No. 1 word code of a No. 1 multiple meaning word, a No. 1 normal word code, a No. 1 word code of a No. 2 multiple meaning word, a No. 4 word code of a No. 3 multiple meaning word, and a No. 2 normal word.

⋮

22) a No. 3 word code of a No. 1 multiple meaning word, a No. 1 normal word code, a No. 2 word code of a No. 2 multiple meaning word, a No. 2 word code of a No. 3 multiple meaning word, and a No. 2 normal word.

23) a No. 3 word code of a No. 1 multiple meaning word, a No. 1 normal word code, a No. 2 word code of a No. 2 multiple meaning word, a No. 3 word code of a No. 3 multiple meaning word, and a No. 2 normal word.

24) a No. 3 word code of a No. 1 multiple meaning word, a No. 1 normal word code, a No. 2 word code of a No. 2 multiple meaning word, a No. 4 word code of a No. 3 multiple meaning word, and a No. 2 normal word.

Next, in the No. 1 to k, constituting word codes are compared with each other to identify the number of identical constituting word codes, and a case where the most number of the constituting word codes from No. 1 to k is selected (S3350~S3360).

In the above example, when Nos. 1 to k are orderly assigned to each of the 24 sets, a set No. having the greatest number of constituting word codes appearing at least two times is selected.

For example, when the constituting word codes of the set No. 23 are "(20)(27)(28)(29), (20)(31)(11)(37), (40)(41)(31) (99), (11)(55)(1), (11)(60)", the constituting word code "(20)" appears two times, the constituting word cods "(31)" appears two times, and the constituting word code "(11)" appears three times. Therefore, in the set No. 23, the total number of constituting word codes appearing at least two times becomes "7".

Likewise, the total number of constituting word codes appearing at least two times is identified for each set from No. 1 to No. 24. In this example, it is noted that the set No. 11 having the greatest number of constituting word codes appearing at least two times. Therefore, the set No. 11 is selected as a word code of the input word.

That is, when the set No. having the greatest number of constituting word codes appearing at least two times, the input word is codes as the selected word code (S3370).

Figure 9D:
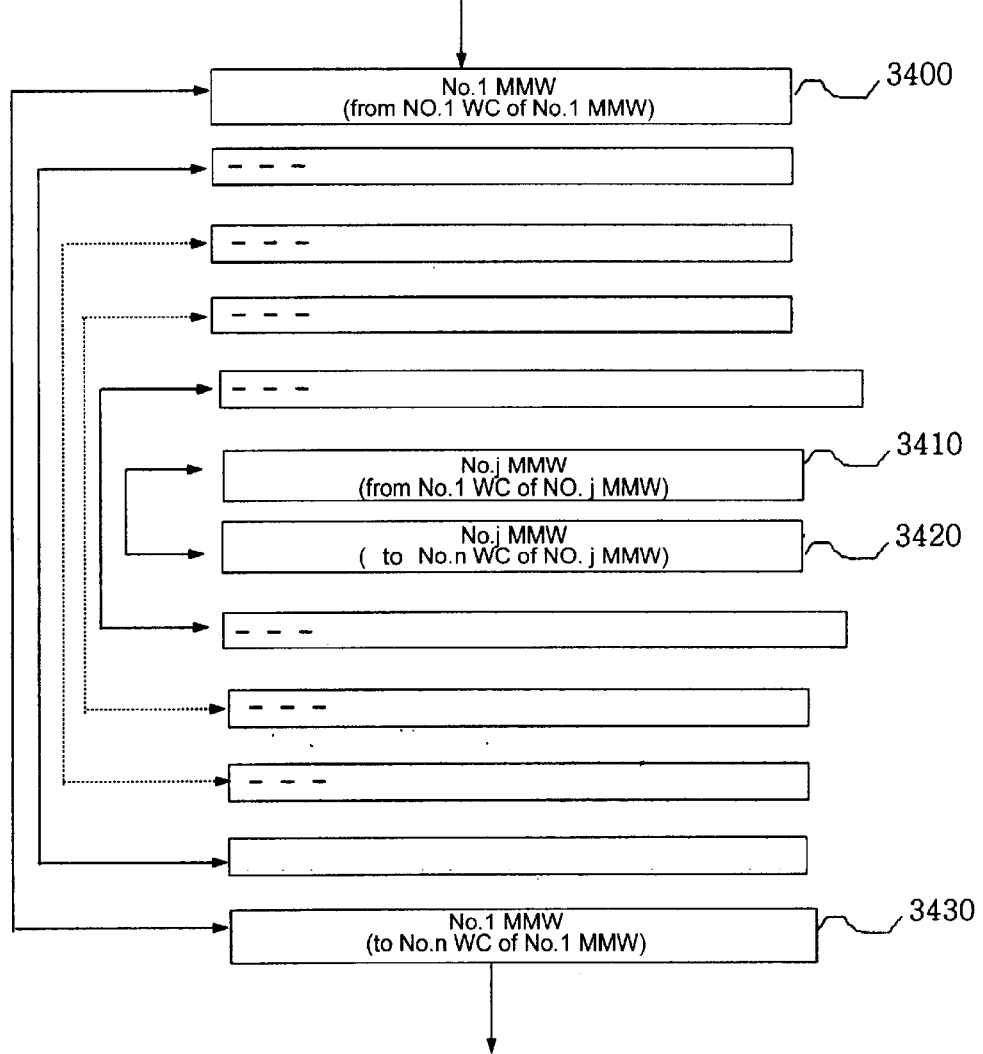

FIG. 9d shows a loop of a program for forming the combination of the numbers illustrated in the flowchart of FIG. 9c. There are j multiple meaning words each having "n" word codes.

A loop forming from the No. 1 word code to the No. n word code in the No. 1 multiple meaning word becomes the outermost loop. A loop forming from the No. 1 word code to the No. n word code in the No. j multiple meaning word becomes the innermost loop (S3400~S3430).

For example, if there are five multiple meaning words in the input word, there are five loops. If there are three word codes in the No. 1 multiple meaning word, the loop of the No. 1 multiple meaning word will be performed by three times from the No. 1 word code to the No. 3 word code. In addition, when there are four word codes in the No. 5 multiple meaning word, the loop of the No. 5 multiple meaning word will be performed by four times from the No. 1 word code to the No. 4 word code. Accordingly, the number of cases "k" where the input word can be codes will be as follows;

k=(the number of word codes of the No. 1 multiple meaning word)×(the number of word codes of the No. 2 multiple meaning word) x . . . x (the number of word codes of the No. j-1 multiple meaning word)×(the number of word codes of the No. j multiple meaning word)

Figure 9E:
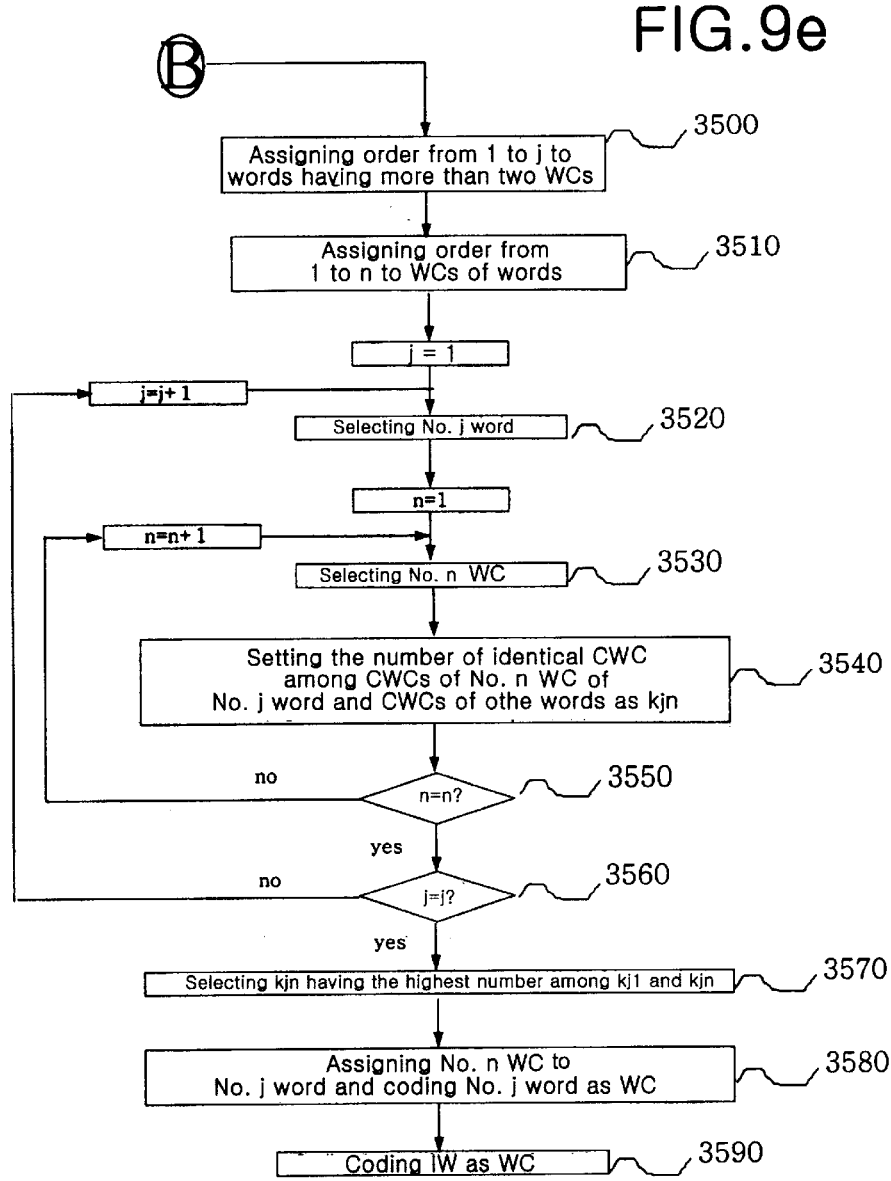

FIG. 9e shows a flowchart illustrating a coding method when the number of multiple meaning word is more than two according to another embodiment of the present invention.

Numerals from No. 1 to No. j are respectively assigned to the multiple meaning words, and numbers from the No. 1 to the No. n are respectively assigned to the word codes of each multiple meaning word (S3500~S3510).

Constituting word codes of the word codes of the multiple meaning words are compared with each other, and the number of constituting word codes appearing at least two times is identified and corresponded to "kjn" (S3520~S3560).

For example, when the number of word code of the No. 3 multiple meaning word is three, the constituting words of the word codes are compared with each other. If the number of the constituting word codes appearing at least two times in the No. 1 word code of the No. 3 multiple meaning word is three, and the number of the constituting word codes appearing at least two times in the No. 2 word code of the No. 3 multiple meaning word is four, k31 becomes three and K32 becomes four.

Among kjl and kjn, kjx having the greatest number of constituting word code appearing at least two times is selected, and the No. j multiple meaning word is coded as No. x word code (S3570 -S3580).

For example, when the number of constituting word code appearing at least two times in the No. 1 word code of the No. 3 multiple meaning word having three word codes is three, the number of constituting word code appearing at least two times in the No. 2 word code of the No. 3 multiple meaning word is four, and the number of constituting word code appearing at least two times in the No. 3 word code of the No. 3 multiple meaning word is five, the No. 3 multiple meaning word is coded as the No. 3 word code.

Here, the comparison with other constituting word codes of other word means that the constituting word codes are compared with all of the constituting word codes of other multiple meaning words and normal words. That is, when comparing the No. 1 word code of the No. 3 multiple meaning word with other word codes of other words, if other word is the multiple meaning word, it is compared with all of other constituting word codes of other words.

Using this method, all of the multiple meaning words are coded as word codes (S3590).

In addition, when comparing each of the word codes of a multiple meaning word with constituting word codes, if there is no constituting word code appearing at least two times or the number of identical word code in the constituting word codes appearing more than two times is more than two, the comparison is performed in more extended method. That is, the constituting word codes of a sentence describing a multiple meaning word are compared. The word code of a sentence describing the multiple meaning word is a special word code of the multiple meaning word.

For example, the Korean word "Bunja" used in the chemical field can be described "as a particle composing a material, it can be made by the combination of atoms, and is introduced by Italian chemist".

Accordingly, the sentence can be coded as a word code "ma fm mtbssl, mk aoA ctA intt, ltalia(C) prct Avogadro(C) mkknfi". The special word codes of the sentence are compared with constituting word codes of other words, and the number of constituting word appearing at least two times is identified. Here, the method for coding a multiple meaning word as a word code by comparing constituting word codes of the sentence with constituting word codes of other words is performed in the above described algorithm for coding a multiple meaning word as a word code by comparing constituting word codes of the multiple meaning word with constituting words of other words.

In addition, a code representing a field of the word is included in the constituting word codes to be compared. As an example, the field of chemistry can be coded as "ct".

As described above, when the input word is coded, the most similar information should be retrieved. Therefore, it should be determined how the information is similar.

The determination if the information is similar or not is illustrated in a vector space of the information. That is, in the vector space, the smaller the angle, the more similar in information.

To analyze the basic words. A linguistics analyses should be first performed. That is, a morpheme of words forming the information is analyzed so as to extract basic forms of the words. On the basis of the basic form, the words are coded as word code. When the words forming the information are coded as word codes, the frequency and kinds of the constituting word codes forming the information can be analyzed.

Namely, When the number of basic word is 1400, No. 1 to 1400 are respectively assigned 1400 words, and when the kinds and frequency of the constituting word codes are analyzed, it is determined how many each basic words are used to form the information.

For example, the frequency of the basic words is converted into a location value of Vector space. That is, when each of the basic words is an axis of a virtual Vector space, since the number of basic word is 1400, the number of the axis of the coordinate becomes 1400, and each scale of each axis of the coordinate becomes the frequency.

That is, when the frequency of the No. 1 basic word is 0, the scale of the No. 1 axis of the coordinate becomes 0. In addition, when the frequency of the No. 20 word is 5, the scale of the No. 20 axis of the coordinate becomes 5. The frequency of the No. 30 word is 12, the scale of the No. 30 axis of the coordinate becomes 12.

Accordingly, a value of information "A" to be analyzed can be set, the location of the information "A" can be illustrated as follows:

(1, 0), . . . (20, 5), . . . (25, 7), . . . (30, 12), . . . (1200, 0), . . . (1300, 3), . . . . (1400, 0)

Where, the first numeral in the parenthesis indicates an order of the axis of the coordinates, and the second numeral in the parenthesis becomes a scale of the axis of the coordinate. In addition, the location in the Vector space can be generalized as follows:

(1, V1), (2, V2), (3, V3), (4, V4), (5, V5), - - - (1396, V1396), (1397, V1397), (1398, V1398), (1399, V1399), (1400, V1400).

As described above, each of the information can be represented as a location in the Vector space, and mutual angle in the Vector space indicates the similarity of the information.

While this invention has been described in connection with the most practical and preferred embodiment, it is to be understood that the invention is not limited to the disclosed embodiments, but, on the contrary, it is intended to cover various modifications and equivalent arrangements included within the spirit and scope of the appended claims.

Industrial Applicability

As described above, in the information coding and retrieval system of the present invention, the concept of the information is subdivided and coded as basic word codes. On the basis of the basic word codes, the information is retrieved on the basis of the basic word codes, the desired information can be quickly accurately retrieved.

In addition, according to the coding and retrieval method of the present invention, since a command word for operating a computer program can be selected, the desired program can be automatically operated even when the command word is inaccurate. Furthermore, the information formed of foreign language can be easily retrieved by coding the foreign language in a national language code having the similar or identical meaning.

TABLE 1

| | | | | | | | |
|---|---|---|---|---|---|---|---|
| area | belong | business | choose | creature | doubt | example | fly, n, v | grace | hot, adj | large |
| argue | bend | busy | church | cricket | down, adj | except | fold | grain | hotel | last, adj |
| arm | berry | but | cigarette | crime | drag, v | exist | food | gram | hour | late |
| armour, n | between | butter, n | cinema | crop, n | draw, v | expect | fool, n | grammar | house, n | laugh |
| around | beyond, adv | button, n | circle, n | cross, n | dream | explain | foot, n | grass, n | how | law |
| art | bicycle, n | buy, v | city | cry | dress, v | eye | football | green | human | lead, v |
| article | big, adj | by | claim | cup, n | drink, n, v | | for | grey, n | hundred | leaf, n |
| as | bill, n | | class | curtain, n | drive, v | __F__ | foreign | grief | | learn |
| ashamed | bind, v | __C__ | clay | curve | drug, n | face | forest | ground, n | __I__ | leather |
| ask | bio, n | cake, n | clear, n | custom, n | drum, n | fact | forgive | group, n | ice, n | leave, v |
| association | bird | calculate | clock, n | cut | dry | factory | fork, n | grow | idea | leg, n |
| at | birth | call | close, adj | cycle, v | duck, n | fail | form | guard | if | level, adj |
| atom | birthday | calm, adj | cloth | | dull | fair, adj | four | guess | ill, adj | library |
| aunt | bit | camera | cloud, n | __D__ | during | faith | fox, n | guest | imagine | lie |
| autumn | black, adj | camp, n | coal | dance | | fall | frame, n | gun, n | in | life |
| average, n | blade | can, v, n | coast, n | dark | __E__ | false, adj | free | industry | light | lift |
| avoid | bless | candle | coffee | daughter | each | familiar, adj | freeze, v | | ink, n | like, v |
| awkward | blind | cap, n | coin, n | day | ear | family | fresh | __H__ | insect | limit |
| | blood, n | capital, n | cold | dead, adj | early | farm | friend | hair | inside | line, n |
| __B__ | blue | captain, n | collage | deal, n | earth, n | fashion, n | from | half | intend | lion |
| baby | boat, n | car | color | deceive | east | fat | fruit, n | hand | interest | lip |
| back, adj | body | card, n | come | declare | easy | fate | fulfil | handle | internet | liquid |
| bacteria | boil, v | case, n | comfort | decorate | eat | father, n | full, adj | happen, v | iron, n | list, n |
| bad | bomb | cat | common, adj | decrease | economy | favour, n | fun | happy | island | liter |
| bag, n | bone, n | catch, v | communication | deep, adj | edge, n | fear | fur, n | hard | it | little |
| bake | book, n | cattle | company | deer | egg, n | feather, n | furniture | hat | | live, v |
| balance | border | cause | compete | defence | eight | feel, v | future | have | __J__ | local, adj |
| ball | born | C.D. | complete | degree | either | fellow, n | | he | jewel | lock |
| banana | bottle, n | cell | computer | delicate | elastic | female | __G__ | head, n | job | long, adj |
| band, n | bowl, n | cellular phone | concern, n | desert, n | elbow, n | fever | gain, v | health | join | look |
| bank, n | box, n | cement, n | confuse | deserve | electric | few | game, n | hear | joke | love |
| bar, n | boy | cent | conscious | desk | electronic | fifth | garage, n | heart | judge | low, adj |
| bare, adj | brain, n | centimeter | contain | destroy | elephant | fight | garden | heat | juice | luck, n |
| base, n | brass | center, n | continue | diamond | else | fill, n | gas, n | heaven | jump | lump, n |
| basket | brave, adj | century | control | dictionary | employ, v | film | gate, n | heavy, adj | | lung |
| be | bread | ceremony | cook | difference | empty, adj | find, v | general | help | __K__ | |
| beam, n | breakfast, n | chain | cool, adj | difficult | end | fine, adj | gene | her | keep, v | __M__ |
| bean | breast, n | chair, n | copper | dig, n | enemy | finger, n | germ | here | key, n | machine, n |
| bear | breath | chalk, n | copy | dirt | engine | fire | get | hide, v | kilo | mad |
| beauty | brick, n | chance, n | cord, n | discover | engineer, n | first, adj | gift | high, adj | kind | magazine |
| because | bridge, n | charge | corn | dish, n | English | fish | girl | history | king | magic |
| become | bright, adj | chase, v | cotton | ditch, n | enjoy | fit, v | give, v | hit | kingdom | mail |
| bed, n | bring | cheek, n | cough | divide, v | entertainment | five | glass, n | hold | kiss | make, v |
| bee | broadcast | cheese | council | DNA | escape | fix, n | glory, n | holiday | knee, n | man, n |
| beer | brother | chemistry | count, n | do, v | even, adj | flag, n | go, v | holy | knife, n | manage |
| before | brown, adj | chest | course, n | doctor, n | evening | flat | goat | home, n | know, v | many |
| beg | building | chicken, n | court, n | dog, n | event | flesh | God | honest | | map, n |
| begin | bullet | chief | cover | dollar | ever | floor, n | gold | hope | __L__ | mark |
| believe | burst | child | coward | door | every | flour | good | horse, n | land | market, n |
| bell | bus, n | chin | crack, n | dot, n | evil | flow | goodbye | hospital | language | marry |
| | bush, n | chocolate | cream, n | | examine | flower, n | government | host, n | | material |

TABLE 1-continued

| | | | | | | |
|---|---|---|---|---|---|---|
| need | P | president | relation | see, v | sleep, v | stiff, adj | surface, n | thunder | V | why |
| needle, n | pack, v | press, v | religion | seed, n | slide | stocks | sweet | ticket, n | value, n | wide, adj |
| nerve, n | page, n | prevent | remain | sell, v | slope | stomach, n | swell, v | tie | vegetable | width |
| nest, n | pain, n | price, n | remove, v | send | slow | stone, n | swim | tiger | vehicle | wife |
| net, n | pair, n | prince | repair | sense, n | small | stop | swing | time, n | verb | wild, adj |
| network, n | paper, n | print | repeat, v | separate, adj | smell | store, n | sword | timetable, n | very, adj | will |
| new | parallel, adj | private, adj | republic | serious | smoke | storm, n | sympathy | tin | view, n | win, v |
| news | parent, n | prize, n | respect | servant, n | smooth, adj | story | system | tire, v | village | wind |
| newspaper | parliament | problem | rest | service, n | snake, n | straight, adj | | title | visit | wind, n,v |
| next, adj | part, n | process, n | restaurant | set, n | snow | strange | T | to | virus | window |
| night | party, n | produce, v | result | seven(th) | so | street | table, n | tobacco | voice, n | wine, n |
| nine | past | profession | return, v | severe | soap, n | stretch | tail, n | today | vote | wing, n |
| no | peace | program | reward | sew | soil, n | structure, n | tall | toe, n | | winter, n |
| noise, n | pen, n | proof, n | rice | sex, n | soldier, n | student | taste | together | W | wire, n |
| north | pencil, n | proud | rich | shade | solid | study | tax | tomorrow | wages | wise, adj |
| nose, n | people, n | public | ride | shame, n | some | success | taxi, n | tool, n | waist | with |
| not | pepper, n | pull | right, adj | share | son | suck, v | tea | tooth | waiter | witness, n |
| noun | per | pump | ring | sharp, adj | sorrow, n | star, n | teach | top, n | wake, v | woman |
| now | person | punish | ripe | she | sort, n | start | team, n, v | total, adj | walk | wood |
| number, n | pet, n, v | pure | rise, v | sheep | soul | stay | tear, n, v | touch | wall, n | wool |
| nurse | photography | purple | river | sheet | sound, n | steady, adj | telephone | tour | wander | word, n |
| nut | physics | push | road | shelf | soup | steal, v | television | tower, n | want, v | work |
| nylon | piano, n | put | rock, n | shine, n | sour, adj | steam, n | temperature | town | war, n | world |
| pig, n | picture, n | | roll, v | ship, n | south | steel, n | tent | waste | warm, adj | worm, n |
| pilot | Q | R | shirt | space, n | step | temple | toy, n | worry | | |
| O | pink, n | rabbit, n | roof, n | shock, n | special | stiff, adj | traffic, n | tend | worship | worthy |
| object, n | place | radio, n | room, n | shoe, n | speech | stocks | tennis | train | watch | wound |
| ocean | plan | rain | root, n | shoot, v | speed, n | stomach, n | test | translate | way | water |
| odd | plane, n | rare | rose | shop | spell | stone, n | than | tree | we | wrist |
| of | plant | rat, n | rough, adj | short, adj | spend | stop | thank | trick, n | weak | write |
| official | plastic | rather | rub, v | shoulder | spin, v | store, n | that | tropical | weapon | wrong, adj |
| often | plate, n | raw, adj | rule | show, n, v | spoil, v | storm, n | the | trousers | wear, v | |
| oil | play | read, v | run | side, adj | spoon, n | story | theater | try | weather, n | Y |
| old | plural | ready, adj | | signal | sport, n | straight, adj | them | twice | weave, v | yard |
| on | poem | real | S | signature | spread, v | strange | there | twist | week | year |
| one | poison | recent | safe, adj | silence, n | spring | street | they | tyre | welcome | yellow, adj |
| onion | police, n | record, n | sail | silk | square, adj | stretch | thick, adj | | west | yes |
| only | polite | recoder | salt, n | silver | stage, n | structure, n | thin, adj | U | wet, adj | yesterday |
| open, v | politics | red | same | simple | stamp | student | thing | under | what | yet |
| opinion | poor | regular, adj | sand, n | since | stand, v | study | think, n | uniform, n | wheat | you |
| or | population | | satisfy | sing | standard | success | thirst, n | union | wheel, n | young |
| orange | port, n | | save, v | sink, v | star, n | suck, v | this | universe | when | |
| order | potato | | say, v | sister | stay | sugar, n | though | university | where | |
| organ | pound, n | | school, n | sit | steady, adj | sum | thousand(th) | up | whether | |
| origin | powder, n | | science | six(th) | steal, v | summer, n | thread, n | upper | which | |
| other | power, n | | screw | size, n | steam, n | sun, n | three | urgent | white | |
| out | pray | | search | skin, n | steel, n | supper | throat | USA | who | |
| over | prepare | | season, n | skirt, n | step | support | through | use | whole | |
| oxygen | present, n, adj | | seat | sky, n | | sure, adj | throw | usual | | |
| | | | second | | | | | | | |

What is claimed is:

1. An information coding and retrieval system for making a basic word code by dividing a word into a basic word which represents the word in the basic word code, wherein the basic word is selected and coded, the system comprising:
    an input part for inputting words;
    a database for storing information, wherein the information is subdivided into a basic word, which is then coded into a word code; and
    a central process unit or a client system for coding the inputted words, and for retrieving the information stored in the database that corresponds to the inputted words by comparing basic word codes of the inputted words with basic word codes of the information that is stored in the database, wherein the unit or system performs the steps of:
    providing a menu for inputting a retrieval word to the user;
    coding the retrieval word into a basic word code;
    retrieving the coded word code from the database;
    providing the information corresponding to the retrieved word code to the user;
    retrieving word codes having a main-constituting word code identical to the main-constituting word code of the retrieved word;
    retrieving word codes having sub-constituting word codes identical to those of the retrieved word;
    selecting a word code having the highest number of identical codes except for the main-constituting word codes and the sub-constituting word codes; and
    providing the information corresponding to the selected word code to the user.

2. The system of claim 1 wherein the database further comprises command words coded as word codes for operating a plurality of computer programs and words for describing the programs, and the central process unit codes the-inputted word as a basic word, selects a command word corresponding to the coded basic word from the database, and operates a computer program corresponding to the selected command word.

3. The system of claim 1 wherein the client system comprises a user's input part for inputting words, a client processor for coding the input words as basic word codes and transmitting the basic word codes to the central process unit, and a client database in which a word code list for the coded words is stored.

4. The system of claim 1 further comprising a display for displaying the information and an interface connected to the client system and other servers.

5. A method for coding and retrieving information using an information coding and retrieval system for making a basic word code by dividing a word into a basic word which represents the word in the basic word code, wherein the basic word is selected and coded, the system comprising:
    an input part for inputting words;
    a database for storing information, wherein the information is subdivided into a basic word, which is then coded into a word code; and a central process unit or a client system for coding the inputted words, and for retrieving the information stored in the database that corresponds to the inputted words by comparing basic word codes of the inputted words with basic word codes of the information that is stored in the database, the method comprising the steps of:
    a) storing information into a database after subdividing the information into basic words and coding the information as basic word codes;
    b) coding inputted word as a basic word code; and
    c) retrieving the information stored in the database to find information corresponding to the word code of the inputted word by comparing basic word codes of the inputted words with basic word codes of the information that is stored in the database;
    wherein when the inputted word is a sentence, step c) further comprises:
    subdividing the inputted word into basic words;
    coding the inputted word into a basic word code; and
    retrieving information having a word code identical to the coded word code from the database;
    wherein when there is no word code identical to the word code of the inputted word in the database, the step of retrieving further comprises the step of searching the information for a noun, a verb, and an adjective that correspond to a noun, a verb, and an adjective of the inputted word;
    wherein when there is no information, searching the information for a word code corresponding to a noun, a verb, and an adjective of the input word regardless of speech; and
    wherein when there is no information for a word code corresponding to a noun, a verb, and an adjective of the input word regardless of speech, information having a highest number of identical sub-constituting word codes is searched among a plurality of information having an identical main-constituting word code to that of the inputted word.

6. The method of claim 5 wherein when the inputted word is a foreign language, the inputted word is coded as a word code of a national language having the same meaning as the foreign language.

7. The method of claim 5 wherein in step b), main words among words describing the inputted word are coded.

8. The method of claim 5 wherein in step b), the inputted word is coded while a number of code digits of the basic word is uniformly maintained.

9. The method of claim 5 wherein in step b), the inputted word Is coded according to a code arrangement order set as a function of speech of the basic word.

10. The method of claim 5 wherein when the inputted word is a sentence, a functioning code is assigned to each word of the sentence.

11. The method of claim 5 wherein when the inputted word is a multiple meaning word having more than two meanings, word codes describing each meaning are compared, and one of the word codes are selected and coded.

12. The method of claim 11 wherein when the constituting word codes of the multiple meaning word are compared with constituting word codes of other words, one or more two word codes of the multiple meaning word is selected, and the multiple meaning word is coded as the selected word code.

13. The method of claim 11 wherein when the number of multiple meaning words is more than two, the step of retrieving further comprises the steps of:
    assigning an order to the multiple meaning words;
    establishing a plurality of word code sets using a combination of word codes of the multiple meaning words by assigning order to word codes of the multiple meaning words;
    comparing constituting word codes in each set and selecting a word code set having the highest number of constituting word codes appearing at least two times; and
    coding the multiple meaning words as the selected multiple word code.

14. The method of claim 11 wherein when the number of multiple meaning words is more than two, the step of retrieving further comprises the steps of:
- comparing word codes of each multiple meaning word with word codes of other multiple meaning words and normal words to select the most identical word code; and
- coding the multiple meaning word as the selected multiple word code.

15. The method of claim 11 wherein when comparing constituting word codes of each word code of the multiple meaning word, constituting word codes of a special word code of the multiple meaning word are also compared, and the constituting word codes to be compared include a field identification code.

16. The method of claim 5 wherein step c) further comprises steps of:
- classifying the input word into multiple meaning words and normal words;
- coding the normal words as word codes;
- coding the multiple meaning words into multiple meaning word codes,
- determining a degree of identity between the multiple meaning word codes and other word codes and selecting the highest identical multiple meaning word code;
- coding the multiple meaning words as the selected multiple word code.

17. The method of claim 5 wherein step c) further comprises the steps of:
- providing a menu for inputting a retrieval word to the user;
- coding the retrieval word into a basic word code;
- retrieving the coded word code from the database; and
- providing the information corresponding to the retrieved word code to the user.

18. The method of claim 17 wherein when the word code of the retrieved word is not in the database, the step of retrieving further comprises:
- inputting a message describing the retrieval;
- subdividing the message into basic words;
- coding the basic words of the message into word codes including main-constituting word codes and sub-constituting word codes; and
- retrieving the coded word code from the database.

19. The method of claim 17 wherein the step of retrieving further comprises the steps of:
- retrieving word codes having a main-constituting word code identical to the main-constituting word code of the retrieved word;
- retrieving word codes having sub-constituting word codes identical to those of the retrieved word;
- selecting a wore code having the highest number of identical codes except for the main-constituting word codes and the sub-constituting word codes; and
- providing the information corresponding to the selected word code to the user.

20. The method of claim 5 wherein step c) comprises searching the information having the highest number of identical constituting word codes of the retrieved word to be retrieved.

21. The method of claim 5 wherein step c) comprises searching the information having a similar frequency of the constituting word codes of the information to be retrieved.

22. The method of claim 5 wherein the basic words are assigned with numerals and represented by an axis of coordinates, and the frequency of the basic words Is represented by a scale on the axis of coordinates to display each of the information as a location valve in a Vector space.

23. The method of claim 5, wherein the information of step c) is identical or similar to a constituting word code of the retrieved word.

* * * * *